(12) United States Patent
Ryoichi et al.

(10) Patent No.: US 7,618,729 B2
(45) Date of Patent: Nov. 17, 2009

(54) LIQUID FUEL DIRECT SUPPLY FUEL CELL SYSTEM AND ITS OPERATION CONTROLLING METHOD AND CONTROLLER

(75) Inventors: Okuyama Ryoichi, Takatsuki (JP);
Ishimaru Fumiya, Takatsuki (JP);
Nomura Eiichi, Takatsuki (JP);
Takemitsu Takatomo, Takatsuki (JP)

(73) Assignee: GS Yuasa Corporation, Kyoto-Shi, Kyoto (JP)

( * ) Notice: Subject to any disclaimer, the term of this patent is extended or adjusted under 35 U.S.C. 154(b) by 764 days.

(21) Appl. No.: 10/529,445

(22) PCT Filed: Sep. 29, 2003

(86) PCT No.: PCT/JP03/12451

§ 371 (c)(1),
(2), (4) Date: Mar. 28, 2005

(87) PCT Pub. No.: WO2004/030134

PCT Pub. Date: Apr. 8, 2004

(65) Prior Publication Data

US 2006/0141307 A1    Jun. 29, 2006

(30) Foreign Application Priority Data

Sep. 30, 2002   (JP)   ............................. 2002-287976
Jul. 16, 2003    (JP)   ............................. 2003-275703

(51) Int. Cl.
*H01M 8/04* (2006.01)
*H01M 8/10* (2006.01)

(52) U.S. Cl. ............................. 429/24; 429/13; 429/22; 429/23

(58) Field of Classification Search .................. None
See application file for complete search history.

(56) References Cited

U.S. PATENT DOCUMENTS

| 4,262,063 | A | 4/1981 | Kudo et al. |
| 4,629,664 | A | 12/1986 | Tsukui et al. |
| 4,810,597 | A | 3/1989 | Kumagai et al. |
| 2004/0185316 | A1* | 9/2004 | Wells et al. ................... 429/22 |
| 2005/0287406 | A1* | 12/2005 | Takahashi ..................... 429/24 |

FOREIGN PATENT DOCUMENTS

| JP | 56-118273 | 9/1981 |
| JP | 05-307970 | 11/1993 |
| WO | WO 96/12317 | 4/1996 |

* cited by examiner

Primary Examiner—John S Maples
(74) Attorney, Agent, or Firm—The Webb Law Firm

(57) ABSTRACT

A liquid fuel direct supply fuel cell system capable of being operated under optimal conditions. A plurality of cells each having an anode and a positive electrode disposed oppositely through an electrolytic film and being fed, respectively, with liquid fuel and oxidizing agent gas are connected in series as a power generating section (11), which is then provided with a sensor section (12) for detecting the concentration of the liquid fuel in association with a temperature detected by a temperature detecting element thus producing a cell stack (1), and a controller (7) controls high concentration fuel supply amount from a high concentration fuel tank (5) to a fuel tank (2) based on an output signal from the sensor section (12).

10 Claims, 17 Drawing Sheets

LIQUID FUEL DIRECT SUPPLY FUEL CELL SYSTEM AND ITS OPERATION CONTROLLING METHOD AND CONTROLLER

BACKGROUND OF THE INVENTION

1. Field of the Invention

The present invention relates to a liquid fuel direct supply fuel cell system, a method for the operation control and an operation control device. More specifically, the present invention relates to a liquid fuel direct supply fuel cell system, which controls a concentration of the liquid fuel supplied to the fuel cell in order to operate the system at an optimal condition, a method for the operation control and an operation control device.

2. Description of the Related Art

In recent years, problems of the environment, resources, and energy are becoming increasingly important to be solved. As one solution to the problems, fuel cells are being actively developed. Of the fuel cells, a liquid fuel direct supply fuel cell system, particularly a direct methanol fuel cell using methanol as the liquid fuel, having a simple structure, making miniaturization and reduction in weight easy, using the liquid fuel composed of an organic solvent and water as main components directly for electric power generation without reforming and gasifying is expected to be available as a variety of portable power sources, such as mobile power sources and dispersed power systems, such as small power sources used as a power source for computers.

Such a direct methanol fuel cell is constituted by making an assembly of an anode, a cathode, and an electrolyte membrane composed of a polymer electrolyte having a protonic conductivity, by making a cell by placing the assembly between an anode side separator, which is arranged in the anode to supply an aqueous methanol solution as the liquid fuel, and a cathode side separator, which is arranged in the cathode to supply air as an oxidizing agent gas, and by integrating a plurality of the cells to make a generator.

According to the above described direct methanol fuel cell comprising the generator, the direct methanol fuel cell is constituted for stable operation thereof by making it possible to properly supply the aqueous methanol solution as the liquid fuel and to properly supply air as the oxidizing agent gas. In the direct methanol fuel cell properly receiving the aqueous methanol solution and air, the anode produces carbon dioxide and discharges hydrogen ions and electrons by a reaction of methanol and water and the cathode produces water by taking-in hydrogen ions and electrons from oxygen to generate an electromotive force in an external circuit. In other words, the anode discharges the aqueous methanol solution, which is not reacted, and carbon dioxide as a reaction product and the cathode discharges air, in which oxygen has been consumed, and water as the reaction product.

However, a protonic conductive polymer electrolyte membrane has properties providing easy migration of protons and easy permeation of methanol and, thus, methanol supplied to the anode partially reaches the cathode through the electrolyte membrane. As a result, it causes a potential drop in the cathode and a decrease in energy efficiency of the whole cell. In other words, increasing the concentration of methanol causes an increase in the amount of permeated methanol resulting in a remarkable drop of the potential of the cathode, a drop of the output voltage, and finally a decrease in the energy efficiency of the whole cell. On the other hand, decreasing the concentration of methanol enables a reduction in the amount of permeated methanol but, however, causes insufficient supply of methanol, which is necessary for the reaction, to the anode resulting in no generation of an electric current which finally causes a decrease in the energy efficiency of the whole cell. Therefore, for the purpose of operating the direct methanol fuel cell system under an optimal condition, an appropriate management is absolutely necessary for the methanol concentration and the supply amount of methanol to the anode.

The methanol concentration of an aqueous methanol solution in the conventional direct methanol fuel cell system is managed by a method using an electrochemical limiting current, the method using infrared absorption, a method using a change of gravity, and a method using a change of a refractive index. The method using an electrochemical limiting current is the method of preparing a cell, in which the anode is arranged oppositely to the cathode through the protonic conductive polymer electrolyte membrane, for measuring the limiting current, soaking this cell in the methanol solution of a sample for detection, and applying a constant voltage across the anode and the cathode to detect the concentration from a value of the current running in the cell used for measuring the limiting current. Next, the method using infrared absorption is for detecting the concentration on the basis that an increased methanol concentration of the aqueous methanol solution causes an increase in infrared absorption of a specific frequency. Next, the method using gravity is for detecting the concentration on the basis that the increased methanol concentration of the aqueous methanol solution causes a drop of gravity. Next, the method using refractive index is for detecting the concentration on the basis that the increased methanol concentration of the aqueous methanol solution causes an increase in the refractive index. According to a patent document 1 (Japanese re-publication of a PCT Application, JP-T-2002-520778,) it is disclosed that a sensor cell for measuring its activity is mounted on an electrochemical fuel cell including the direct methanol fuel cell.

OBJECT OF THE INVENTION

The method using the electrochemical limiting current, as described above, not only provides a problem, in which an energy loss is large due to a necessity of always applying constant voltage to the cell for measuring the limiting current, but also the problem in which maintenance becomes troublesome because a long term operation of the fuel cell requires replacing the exhausted cell for measuring the limiting current. On the other hand, the following problem arises: the method using infrared absorption requires an infrared generating apparatus and, hence, the cost of the fuel cell becomes higher. In addition, the following problem arises: applying to the direct methanol fuel cell system, which is desired to be miniaturized, is difficult. The method using the change of gravity has the problem in that during the operation of the direct methanol fuel cell system, accurately measuring gravity is difficult due to aqueous methanol solution always flowing and producing bubbles. Furthermore, with the method using the change of the refractive index arises the problem of requiring a CCD for detecting the refractive index resulting in a difficulty of applying the method to the direct methanol fuel cell system allowing an operation temperature to rise to 80 or higher deg C and, also, another problem in that, similar to the method using gravity, no concentration can be accurately detected because of the production of bubbles. Consequently, it is difficult to manage appropriately the methanol concentration of the aqueous methanol solution in the direct methanol fuel cell system.

BRIEF SUMMARY OF THE INVENTION

To solve the problems as described above, the present invention provides a liquid fuel direct supply fuel cell system such as a direct methanol fuel cell system, in which a sensor is installed for detecting the concentration of the liquid fuel by corresponding to a temperature detected by a temperature detector to enable one to manage properly the methanol concentration of an aqueous methanol solution, and to enable one to control properly a supply amount of the liquid fuel supplied. Also provided is an operation controlling method and an operation controller for controlling the operation thereof.

The liquid fuel direct supply fuel cell system including:

a generator constituted by a plurality of cells connected serially or in parallel with each other, in which an anode is installed oppositely to a cathode through a protonic conductive polymer electrolyte membrane to supply a liquid fuel and an oxidizing agent gas to the anode and the cathode, respectively;

a fuel tank storing a liquid fuel to be supplied to the anode;

a high concentration fuel tank storing a high concentration fuel used for regulating a concentration of the liquid fuel in the fuel tank; and a water tank storing water produced by a cell reaction of the generator, a sensor having at least a temperature detector and installed for detecting a concentration of the liquid fuel; and a controller installed for operating at least one of a control of a supply of the high concentration fuel from the high concentration fuel tank to the fuel tank, the control of the supply of water from the water tank to the fuel tank, or the control of the supply of the liquid fuel from the fuel tank to the generator on the basis of the output signal from the sensor.

Preferably, the sensor is installed integrally with the generator.

Preferably, the sensor is constituted by the temperature detector, a membrane, and at least 1 electrode installed on a surface of the membrane.

Preferably, a polymer electrolyte membrane having a protonic conductivity is used as the membrane; the first electrode receiving the liquid fuel and the second electrode receiving the oxidizing agent gas, which are installed on both the surfaces of the membrane, are used as the electrodes; a voltage across the first and second electrodes and a temperature-indicating signal, which is obtained by the temperature detector, of the sensor are used as the output signal from the sensor; and the voltage is converted to the concentration of the liquid fuel on the basis of the temperature-indicating signal.

Further preferably, a liquid permeating membrane through which the liquid fuel permeates is used for the membrane; an oxidation electrode comprising a catalysts for oxidizing the liquid fuel permeated through the membrane is used as the electrode; the oxidizing agent gas is supplied to the oxidation electrode side to allow the liquid fuel, which is permeated through the membrane, to be oxidized by the oxidation electrode; the temperature generated thereby is detected by the temperature detector; the temperature is used as the output signal from the sensor to be converted to the concentration of the liquid fuel.

Particularly preferably, the temperature of the sensor, which is changed by oxidization of the liquid fuel permeated through the membrane, is detected by the temperature detector and converted to the changed concentration of the liquid fuel.

To know the temperature change, it is preferable that, in at least one of a position around a liquid fuel inlet of the generator or the position around an exhausted liquid fuel outlet of the generator, a second temperature detector is installed to detect the temperature around the position to know the difference between the temperature of the sensor and the temperature of the second temperature detector.

According to an operation controlling method of the present invention, as described above, the operation is carried out for at least one of the control of a supply of the fuel from the high concentration fuel tank to the fuel tank, the control of the supply of water from the water tank to the fuel tank, or the control of the supply of the liquid fuel from the fuel tank to the generator.

According to an operation controller of the present invention, the sensor and the controller are installed and, as described above, the operation is carried out for at least one of the control of the supply of the aqueous fuel from the high concentration fuel tank to the fuel tank, the control of the supply of water from the water tank to the fuel tank, or the control of the supply of the liquid fuel from the fuel tank to the generator.

According to the present invention, the concentration of the liquid fuel can be detected by an output signal from the sensor. Integrating the sensor with the generator enables one to build a compact system.

The sensor prepared from the temperature detector, the membrane, and at least 1 electrode, which is installed on the surface of the membrane, enables one to make the sensor simple.

For example, the protonic conductive polymer electrolyte membrane is used as the membrane, the first electrode receiving the liquid fuel and the second electrode receiving the oxidizing agent gas, which are installed on both the surfaces of the membrane, are used as the electrodes, and the voltage across the first and the second electrode and the temperature-indicating signal obtained by the temperature detector are used as the output signal from the sensor. Or, the liquid fuel-permeating membrane is used as the membrane, the oxidation electrode having the catalyst for oxidizing the liquid fuel permeated through the membrane is used as the electrode, the oxidizing gas to the oxidation electrode side is supplied to oxidize the liquid fuel, that permeates through the membrane, by the oxidation electrode, the temperature or the temperature change caused thereby is detected by the temperature detector, and the temperature is used as the output signal from the sensor. In this way, the concentration of the liquid fuel can be appropriately controlled by using the sensor having a simple structure similar to a cell stack. When the second temperature detector is installed in at least one of a place around the liquid fuel inlet of the generator or the place around the liquid fuel outlet of the generator for detecting a temperature around the place, the temperature of the sensor, that is generated by oxidization of the liquid fuel permeated through the membrane, is detected by the temperature detector, the temperature is used as the output signal from the sensor, the difference between the temperature in the position, that is detected by the second temperature detector, and the output signal from the sensor is converted to the concentration of the liquid fuel, the concentration of the liquid fuel can be highly accurately controlled.

According to the operation controlling method of the present invention, the operation can be controlled without applying the constant voltage as in the conventional method by using the electrochemical limiting current and, also, a flow of the liquid fuel and production of bubbles cause no influence as in the method using the change of gravity and the method using the change of the refraction index.

According to the operation controller of the present invention, the energy loss caused by the detection operation can be reduced and an apparatus for applying the constant voltage, the infrared generating apparatus, a gravimeter, and a refractometer, which are necessary for the conventional device, can be made unnecessary resulting in realizing a compact controller.

Preferably, the sensor has one pair of separators, which is placed in the anode side and the cathode side, and the protonic conductive polymer electrolyte membrane and the anode and the cathode, which are installed between the separators, and each of the separators has the via hole for air supply and air outlet and the via hole for fuel supply and fuel outlet. Each cell of the generator has the separator having the via hole for air supply and air outlet and the via hole for fuel supply and fuel outlet. The sensor is arranged in the fuel supplying side of the generator, the via hole for supplying and air outlet in the sensor is communicated to the via hole for supplying and air outlet in the generator, and the via hole for supplying and fuel outlet in the sensor is communicated to the via hole for supplying and fuel outlet in the generator.

Arranging the sensor in the anode side allows a fuel temperature to be measured without any influence of temperature rise in the generator. Communicating the via hole for air supply and air outlet with the via hole for fuel supply and fuel outlet in the sensor and the generator makes supplying the fuel and air easy.

Particularly preferably, in the generator, the end plate in the anode side and the terminal plate in the anode side are installed in one end of a plurality of cells, the end plate in the cathode side and the terminal plate in the cathode side are installed in the other end, and the sensor is installed between the end plate and the terminal plate in the anode side. In such a way, the sensor can be implemented in the fuel supply side separating from each cell of the generator.

Preferably, the temperature detector is mounted on the reverse side of the protonic conductive polymer electrolyte membrane of the separator in the anode side of the sensor. In this position, the fuel temperature can be surely detected and this position of the separator requires no air passage and, thus, the temperature detector can be easily installed. As the temperature detector, a thermistor, a resistance thermometer sensor, and a temperature-dependent semiconductor are used. MEA (a complex made from the protonic conductive polymer electrolyte membrane and the electrodes) of the sensor may have the same size as that of MEA of the generator. However, smaller size enables one to reduce the cost of the sensor. As the temperature detector, a thin type thermistor having a thickness of or thinner than the separator in the anode side is preferably used. Particularly, it is preferable to fix to a groove made in the separator by using an adhesive for blocking against the fuel to prevent corrosion of a lead and denaturation of a material of the thermistor.

Preferably, a fuel concentration decline is detected from the increase in the electromotive force across the first and second electrodes and the fuel concentration rise is detected from the decrease in the electromotive force. As follows, the inventors predict a mechanism of the increase in the electromotive force caused by the fuel concentration decline. When the fuel crosses over from the anode side to the cathode side of the protonic conductive polymer electrolyte membrane, the electromotive force decreases and, hence, the electromotive force is strongly affected by the fuel concentration in the cathode side. The fuel concentration in the cathode side is decreased by supplying the oxidizing agent such as air and increased by crossing-over. Where, a supply rate of air is almost constant and, thus, the fuel concentration in the cathode side is determined by the fuel concentration in the anode side. Therefore, the electromotive force reduces, when the fuel concentration in the anode side increases. On the other hand, the fuel concentration in the cathode side depending on the crossing-over from the anode shows an amplified variation of the fuel concentration in the anode side to enable one to detect the change of the fuel concentration at a high sensitivity.

Particularly preferably, the means for calculating a slope of the change of the electromotive force at the start of the operation is installed. Following the start of the operation, when it is assumed that the temperature of the fuel and the generator is stable, stabilizing the electromotive force of the sensor requires a time of 5 to 20 minutes, for example. Then, calculating a slope of the electromotive force enables one to predict a stabilized value of the electromotive force, for example, and operate a feedback control of the fuel concentration on the basis of a predicted stabilized value. Or, whether the electromotive force reaches a standing value is determined on the basis of the slope and, when it has reached, the feedback control can be started. At the start of the operation, a lag time may be uniformly determined to operate no feedback control during the time. Predicting the stabilized value from the slope of the electromotive force or determining whether the electromotive force reaches the standing value can shorten the time until the feedback control becomes possible. The slope to be calculated is preferably defined as the slope of the electromotive force after the temperature is compensated. By this definition, the change of the slope, which is caused by a temperature variation, can be compensated.

Preferably, the means is installed to measure the temperature of the generator and until the temperature of the generator reaches a predetermined temperature at the start of the operation, the fuel concentration is subjected to the open loop control separately from the electromotive force. The temperature of the generator may be predicted from the temperature of the fuel. Or, the temperature of the generator may be determined by installing the temperature detector separately from the sensor. In this case, when the operation is, for example, started at a low temperature after standing for a long time, the fuel of a high concentration is, for example, supplied to the generator until the temperature reaches the predetermined temperature to raise first the generator. On the other hand, in the case where the temperature reaches originally the predetermined temperature after the operation is stopped for a short time, the feedback control of the fuel concentration can be started in a short time.

According to the liquid fuel direct supply fuel cell system according to the present invention, the concentration of the liquid fuel is detected by detecting the voltage and the temperature-indicating signal of the sensor or by detecting the temperature of the sensor to control the supplied liquid fuel to an appropriate concentration. In this way, the operation can be conducted at the optimal condition. On the other hand, the operation controlling method and the operation controller, which control the operation of the liquid fuel direct supply fuel cell system according to the present invention, can contribute to the operation of the liquid fuel direct supply fuel cell system under the optimal condition and, therefore, makes a great contribution to popularizing such a liquid fuel direct supply fuel cell system as the direct methanol fuel cell system.

DETAILED DESCRIPTION OF THE INVENTION

Figure 1:
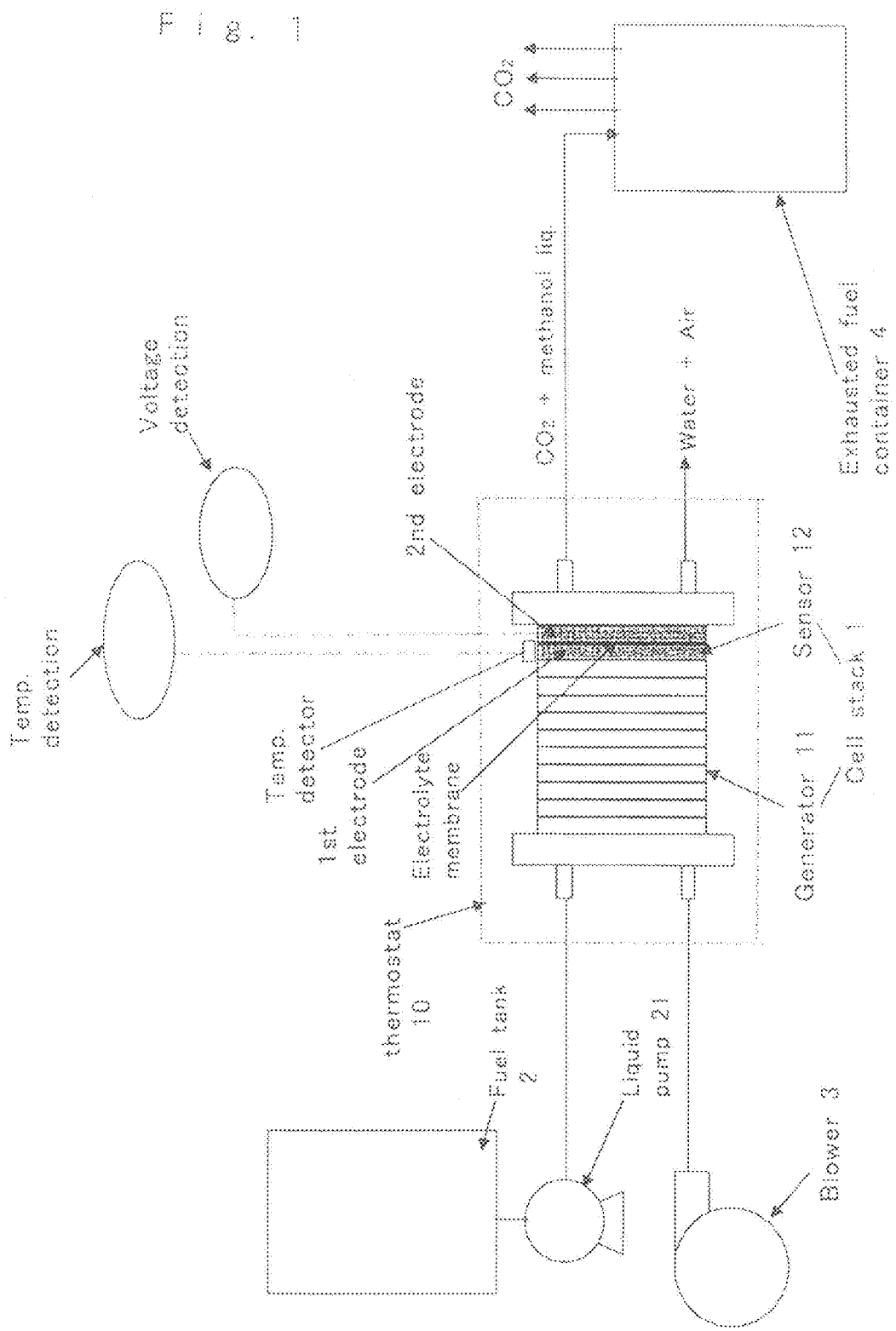
FIG. 1 is a block diagram of a cell stack, which is a base of the present invention, used for evaluation test 1.

The present invention will be described below with reference to examples.

In order to test the liquid fuel direct supply fuel cell system according to the embodiments of the present invention and the operation controlling method and the operation controller for controlling the operation thereof, a generator and a sensor are prepared as follows and these units are integrated to make a cell stack.

Preparing Generator

A fuel electrode paste, which is prepared by blending a fuel electrode catalyst, which is made by supporting platinum and ruthenium on active carbon, with a Teflon (registered trade mark) dispersion solution and a Nafion (registered trade mark) solution, is applied to a carbon paper to prepare an anode. An air electrode paste, which is prepared by blending an air electrode catalyst, which is made by supporting platinum on active carbon, with a PTFE (registered trade mark is Teflon) dispersion solution and a perfluoro sulfonic acid (registered trade mark is Nafion) solution, is applied to the carbon paper to prepare a cathode. Subsequently, these are assembled with both sides of electrolyte membrane (membrane) consisting of Nafion (registered trade mark) 117 by using a hot pressing, the resulted assembly is placed between the anode side separator and the cathode side separator to make a cell, and 34 pieces of this cell are stacked to make a serial connection for preparing a generator.

Preparing Sensor

The constitution is made by the same way as that of the cell, a first electrode prepared in the same way as that of the anode and a second electrode prepared in the same way as that of the cathode are mounted on both of the sides of the electrolyte membrane, a thermistor (temperature detector) is mounted on the anode side separator. A load resistor, which is at least 300 or higher ohms, preferably 1 kilo or higher ohms in a megohm order in the controller side, is arranged between the first electrode and the second electrode to measure the electromotive force across the first electrode and the second electrode.

Preparing Cell Stack

The cell stack is prepared by integrating the sensor and the generator through placing a silicon rubber used for electrically insulating between the sensor and the generator. This integration is aimed to flow the aqueous methanol solution as the liquid fuel from a manifold of the anode side separator of the generator to the first electrode of the sensor and to flow air as the oxidizing agent gas from the manifold of the cathode side separator of the generator to the second electrode of the sensor of the generator to generate an electric potential (voltage) across the first and the second electrodes. Next, the thermistor generates the temperature-indicating signal (the value corresponding to the temperature of the sensor,) which is used for detecting the voltage, converting the voltage to the methanol concentration of the aqueous methanol solution, which corresponds to the temperature-indicating signal, and carrying out the management of the concentration.

Evaluation Test 1

Figure 2:
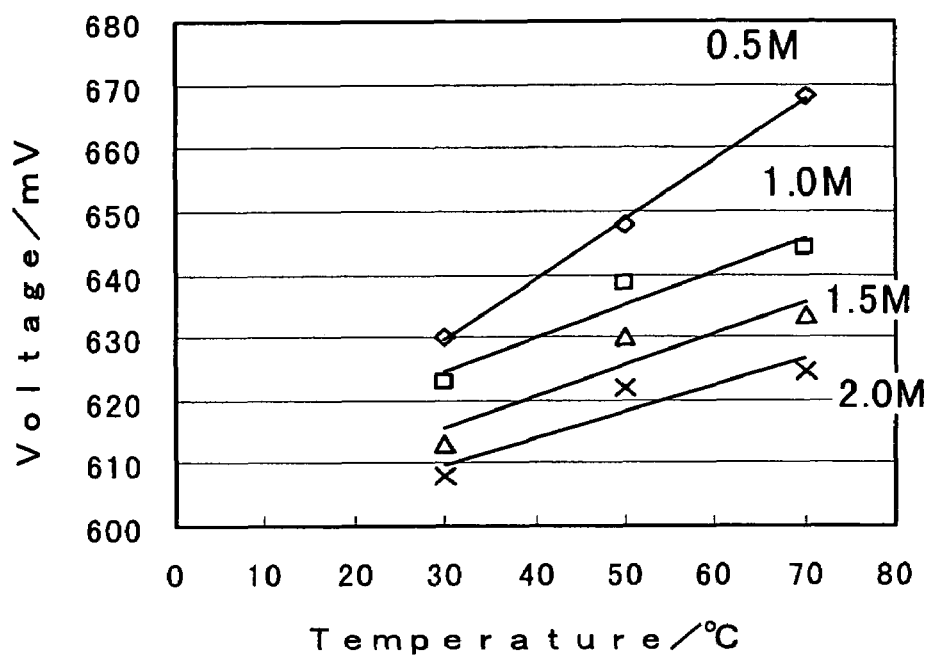
FIG. 2 is a view showing a result of evaluation test 1.

In the cell stack as described above, in order to confirm that obtaining the voltage across the first and the second electrodes and the temperature-indicating signal from the temperature detector as the output signals from the sensor makes it possible to detect the methanol concentration, of which temperature is compensated, of the aqueous methanol solution, the following evaluation test 1 was carried out. As shown in FIG. 1, cell stack 1 (made by integrating sensor 12 with generator 11) is installed in thermostatic bath 10, the aqueous methanol solution as the liquid fuel is supplied from the fuel tank 2 to the anode side through liquid pump 21, air as the oxidizing agent gas is supplied from blower 3 to the cathode side, carbon dioxide as the reaction product and the aqueous methanol solution, which has not contributed to the reaction, are collected from the anode side to an exhausted liquid fuel container 4, water as the reaction product and air, which has not contributed to the reaction, are exhausted from the cathode side, and the voltage and the temperature-indicating signal, as described above, are detected. On the other hand, the methanol concentration of the aqueous methanol solution in the fuel tank 2 is designated to 0.5 M, 1 M, 1.5 M, and 2 M, the temperature in thermostatic bath 10 is designated to 30 deg C., 50 deg C., and 70 deg C., a flow rate of the aqueous methanol solution is designated to 500 ml/min, and the flow rate of air 40 liter/min to operate cell stack 1, and the voltage and the temperature are measured to know their relations to the methanol concentration of the aqueous methanol solution. FIG. 2 shows the result.

Result

From the result shown in FIG. 2, it can be seen that when temperatures are equal, if the methanol concentration of the aqueous methanol solution becomes low, the voltage rises and a range of its change becomes larger when temperatures become higher. From this, measuring the voltage and the temperature-indicating signal as the output signals from the sensor enables one to detect the methanol concentration of the aqueous methanol solution.

Embodiment 1

Direct Methanol Fuel Cell System

Figure 3:
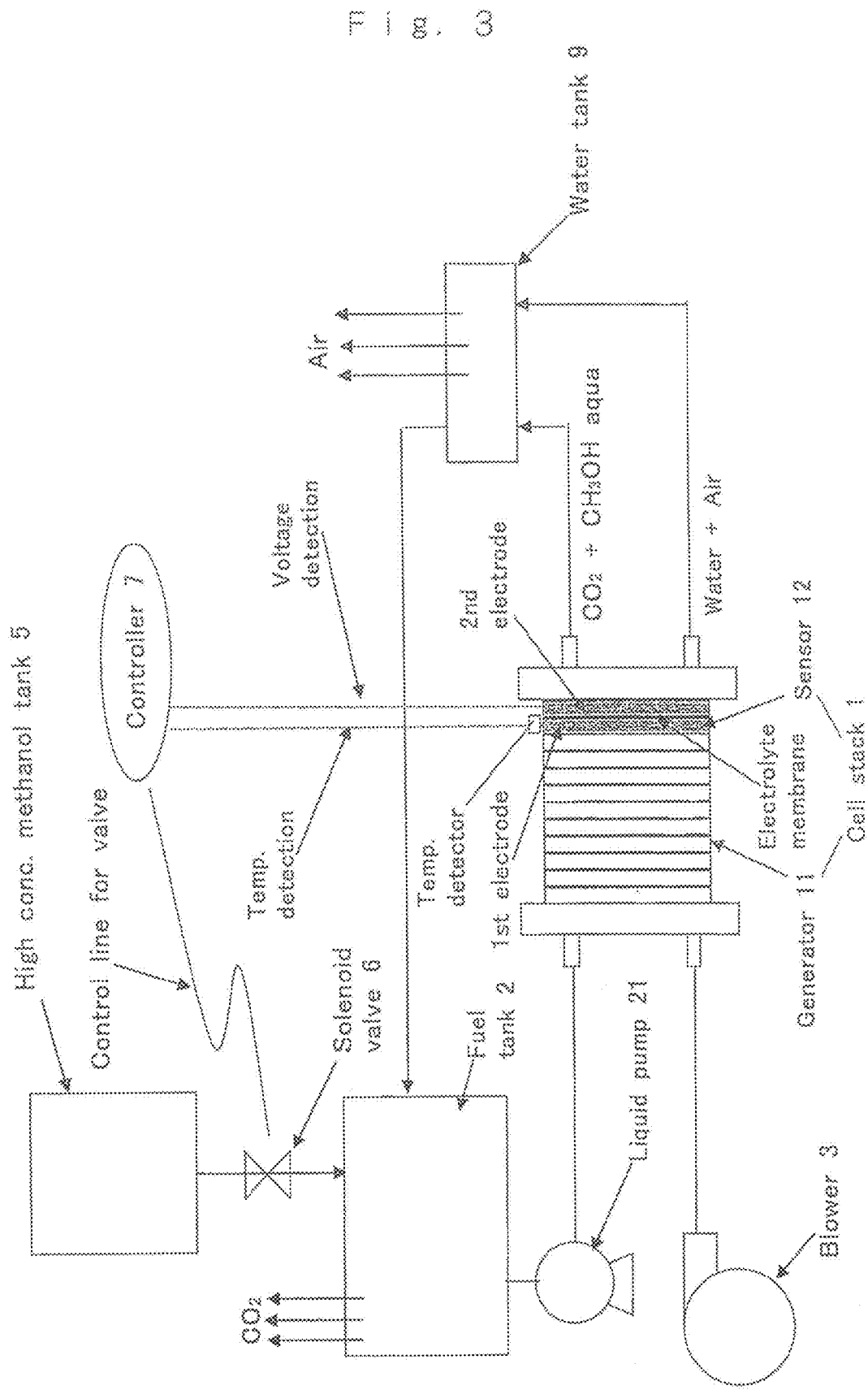
FIG. 3 is the block diagram of a direct methanol fuel cell system of embodiment 1 according to the present invention.

Cell stack 1 is used without thermostatic bath 10 as the direct methanol fuel cell system as shown in FIG. 3 for assigning as embodiment 1. As shown in FIG. 3, cell stack 1, fuel tank 2 for storing the aqueous methanol solution as the liquid fuel, and high concentration fuel tank 5 for storing the high concentration fuel (50 volume-percent aqueous methanol solution) used for adjusting the methanol concentration of the aqueous methanol solution are installed. In order to control the methanol concentration of the aqueous methanol solution supplied from fuel tank 2 to cell stack 1 on the basis of the relation shown in FIG. 2, solenoid valve 6 is installed between fuel tank 2 and high concentration fuel tank 5, solenoid valve 6 works for controlling the supply of the 50 volume-percent aqueous methanol solution supplied from high concentration fuel tank 5 to fuel tank 2 by inputting the voltage and the temperature-indicating signal as the output signals from the sensor 12 in controller 7 to control by a control signal obtained on the basis of the algorithm mentioned later. It is natural that the control such as the control of an opening and closing time of solenoid valve 6 by controller 7 can be changed by the methanol concentration of the aqueous methanol solution supplied from fuel tank 2 to cell stack 1 and the methanol concentration of the 50 volume-percent aqueous methanol solution stored in high concentration fuel tank 5.

Operation Control of Direct Methanol Fuel Cell System

Figure 4:
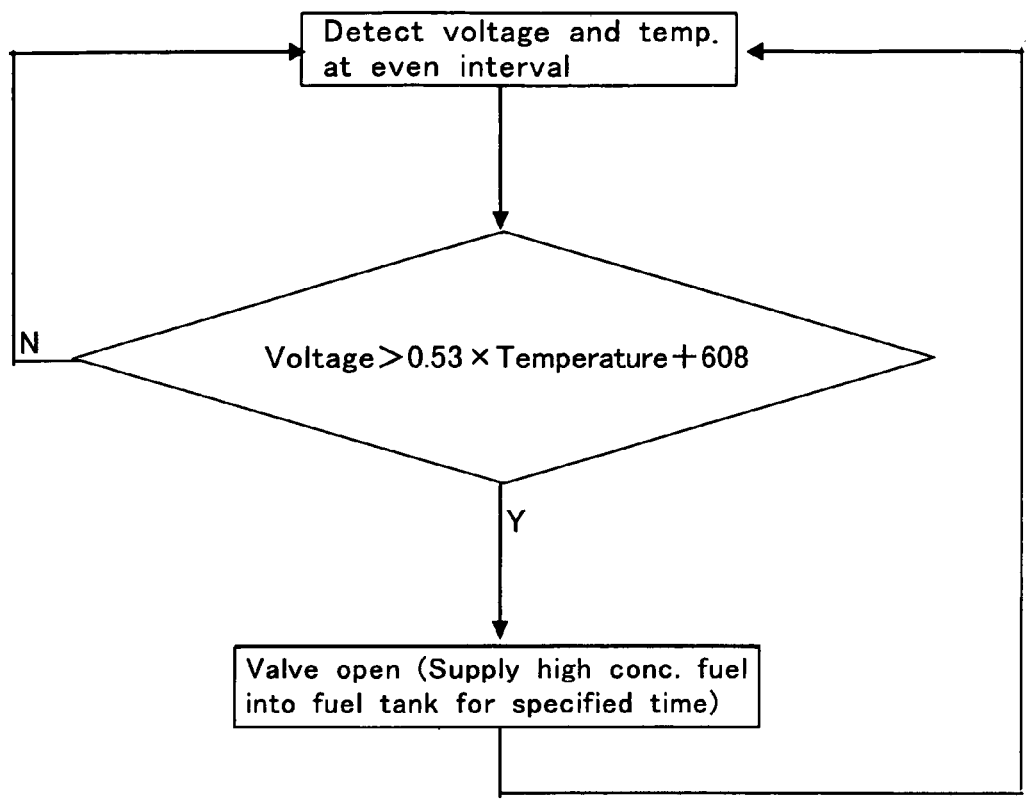
FIG. 4 is an example of an algorithm of an operation controlling method of the system according to embodiment 1.

The method for controlling the operation of the direct methanol fuel cell system as described above is based on the algorithm shown in FIG. 4. The controller for the operation is the apparatus for realizing the algorithm. In other words, for the purpose to control on the basis of the relation shown in FIG. 2, for example, for the purpose to regulate the methanol concentration of the aqueous methanol solution to 1 M, if the voltage (mV unit) detected by sensor 12 is higher than the value made by multiplying a multiplier 0.53 with the temperature-indicating signal (deg C unit) obtained by the temperature detector of the sensor and adding 603 thereto, solenoid valve 6 is opened to supply the 50 volume-percent aqueous methanol solution from high concentration fuel tank 5 to fuel tank 2 for a specific time and if the voltage is lower than the value, solenoid valve 6 is closed to prevent the supply of the 50 volume-percent aqueous methanol solution from high concentration fuel tank 5 to fuel tank 2. On the other hand, it is natural that the values such as the multiplier as described above and the time for opening and closing solenoid valve 6 can be changed in accordance with the methanol concentration of the aqueous methanol solution supplied from fuel tank 2 to cell stack 1 and the concentration of the high concentration fuel (the 50 volume-percent aqueous methanol solution) stored in high concentration fuel tank 5.

Evaluation Test 2

The direct methanol fuel cell system as described above operates continuously to result in a yielding of the constant output (100 W) by the flow rate of the aqueous methanol solution being designated to 500 ml/min and the flow rate of air being designated to 40 liter/min. The trend of the concentration of the aqueous methanol solution in the fuel tank 2 is properly measured by gas chromatography, and the behavior of the voltage of sensor 12 is measured. The result is presented in FIG. 5.

Result

Figure 5:
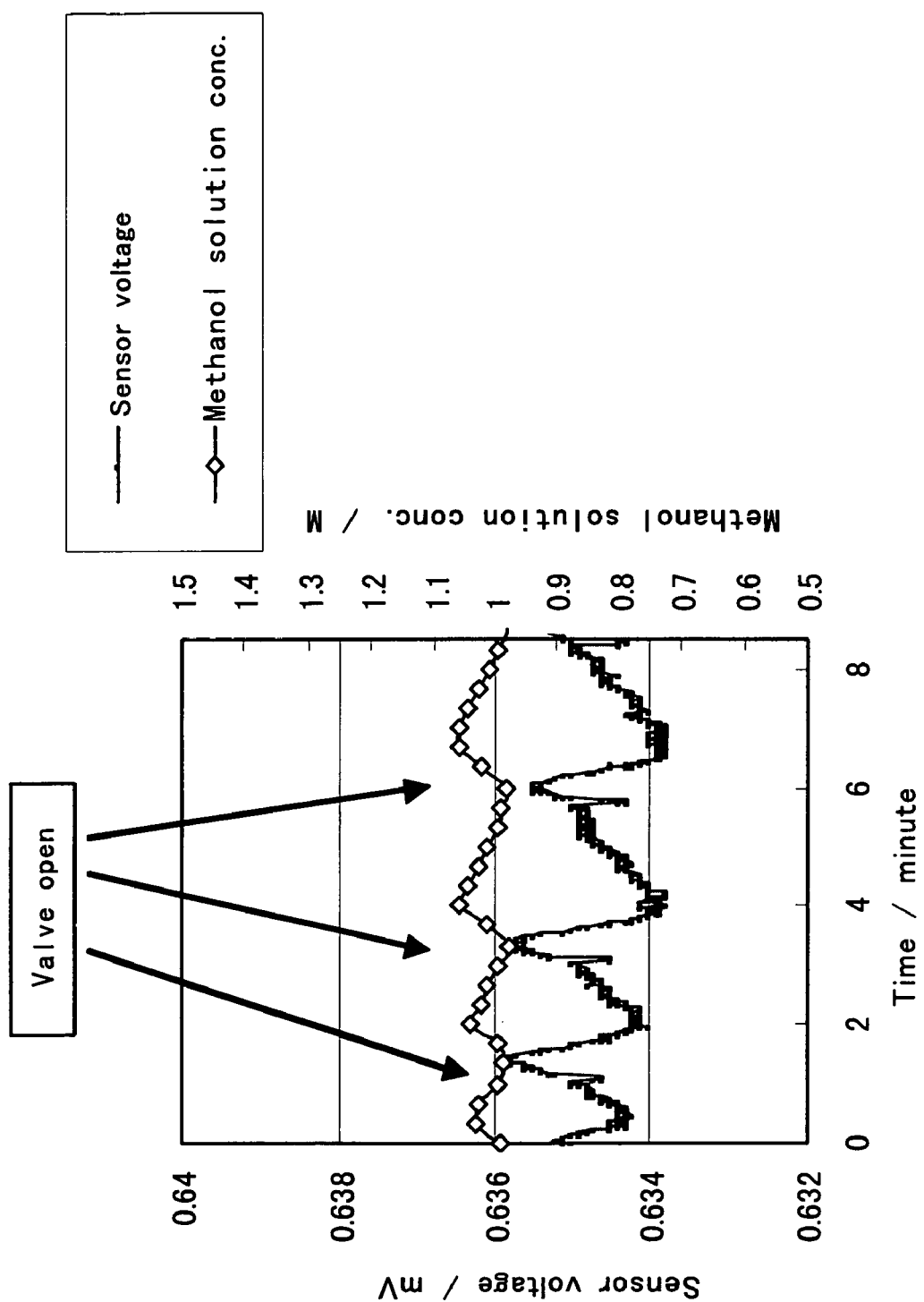
FIG. 5 is the view showing behaviors of a methanol concentration of an aqueous methanol solution and a voltage of a sensor in operation of the system according to embodiment 1 (the view showing the result of evaluation test 2.)

From FIG. 5, it can be seen that the methanol concentration of the aqueous methanol solution is actually controlled to maintain a range from 0.9 M to 1.1 M, for which the target for the management was 1 M. In other words, it was confirmed that at the point where the methanol concentration of the aqueous methanol solution reaches 1 M or lower, solenoid valve 6 is opened to drop the 50 volume-percent aqueous methanol solution resulting in the rise of the methanol concentration of the aqueous methanol solution to about 1.1 M and the control is operated to maintain the management target. In conclusion from this result, it is an effective method to install the sensor 12 for detecting the methanol concentration of the aqueous methanol solution and to control the methanol concentration of the aqueous methanol solution on the basis of the compensation of the voltage thereof by using the temperature.

Preparing Cell Stack

The generator, in which 34 cells are connected serially by stacking as described above, was integrated with the sensor, in which electrodes, which are similar to the anode (first electrode=methanol electrode) and the cathode (oxidation electrode=air electrode,) are mounted oppositely each other through Nafion (registered trade mark) 112 as a liquid (methanol) permeable membrane, and the temperature detector (thermistor) is installed in the position (e.g., the anode side separator) around the liquid permeable membrane (membrane) to prepare the cell stack through the silicon rubber for insulation against the generator. The aim of such an integration is to flow the aqueous methanol solution from the manifold of the anode side separator of the generator to the oxidation electrode by permeating through the membrane via the first electrode (the anode side) of the sensor, to flow air from the manifold of the cathode side separator of the generator to the oxidation electrode of the sensor, to oxidize thereby the aqueous methanol solution by the catalyst of the oxidation electrode of the sensor to raise the temperature thereof, to make the amount of the aqueous methanol solution permeated through the membrane depend on the methanol concentration of the aqueous methanol solution, and also to make the temperature rise by oxidation of the aqueous methanol solution depend on the methanol concentration of the aqueous methanol solution permeated through the membrane to yield the temperature as the output signal from the sensor, and to convert this signal to the methanol concentration of the aqueous methanol solution to carry out the concentration management.

Evaluation Test 3

The cell stack as described above operates to obtain the constant output (100 W) by supplying the aqueous methanol solution at a flow rate of 500 ml/min and a methanol concentration of 0.5 M, 1.0 M, 1.5 M, and 2.0 M and by supplying air at a flow rate of 40 liter/min. The sensor temperature is detected by the temperature detector. The result is presented in FIG. 6. The measurement was started at the point where the temperature of the sensor reaches 50 deg C. by supplying the aqueous methanol solution with the concentration of 0.5 M.

Result

Figure 6:
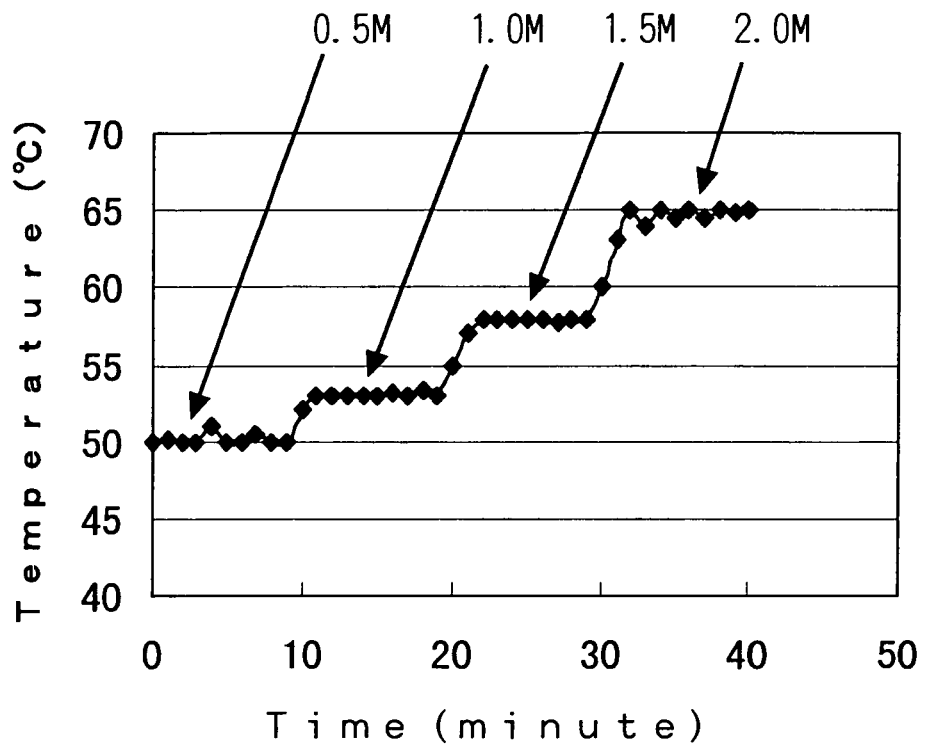
FIG. 6 is the view showing the result of a test of how a temperature changes in accordance with the methanol concentration of the aqueous methanol solution in the operation of the cell stack used for the system according to embodiment 2 (the view showing the result of evaluation test 3.)

From FIG. 6, it can be seen that as the methanol concentration of the aqueous methanol solution becomes high the sensor temperature detected by the temperature detector becomes high. Therefore, the methanol concentration of the aqueous methanol solution can be detected by detecting the temperature of the sensor.

Embodiment 2

Direct Methanol Fuel Cell System

Figure 7:
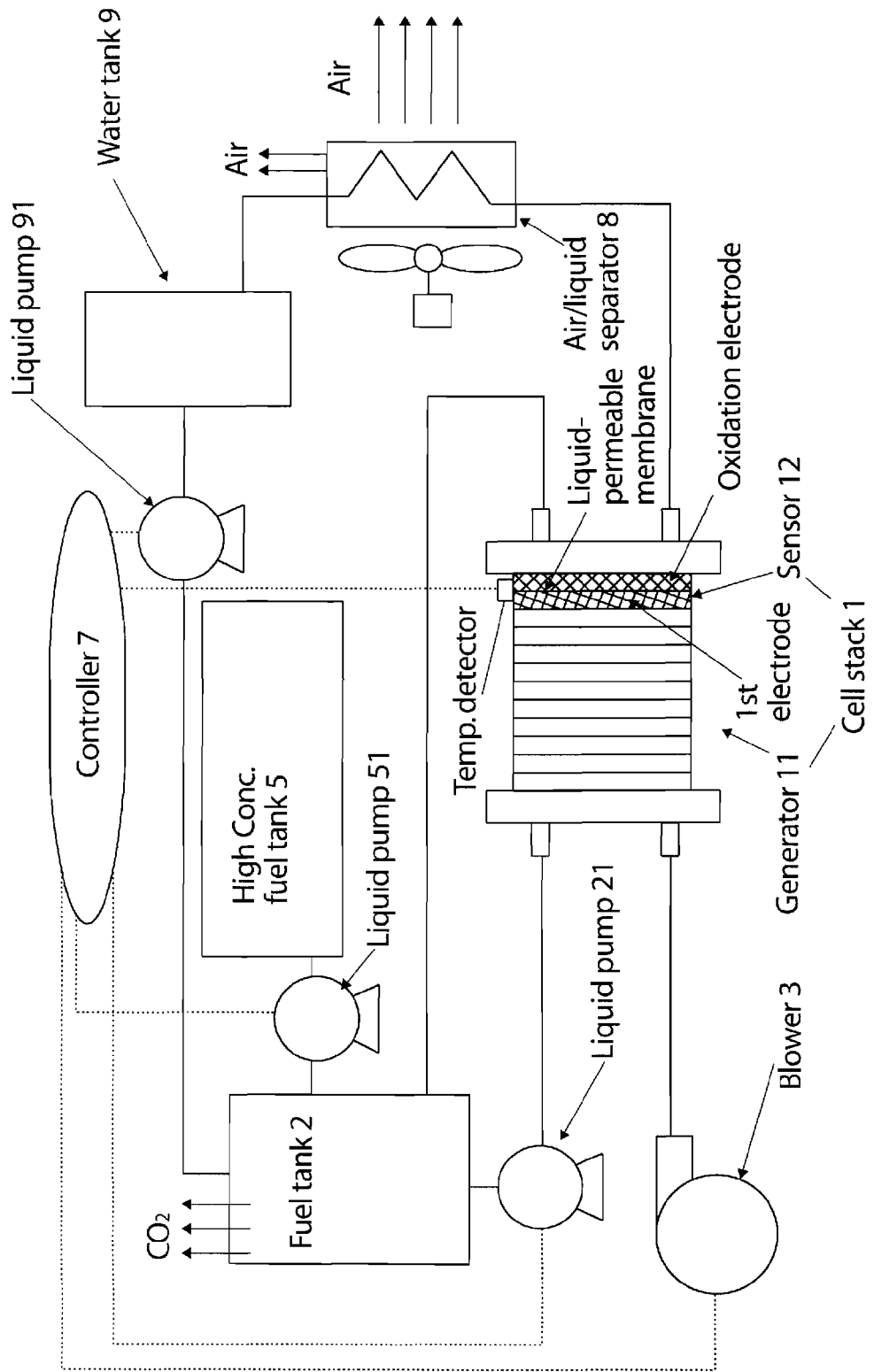
FIG. 7 is the block diagram of the direct methanol fuel cell system of embodiment 2 according to the present invention.

The cell stack was used as the direct methanol fuel cell system as shown in FIG. 7 for assigning as embodiment 2. As shown in FIG. 7, cell stack 1, fuel tank 2 for storing the aqueous methanol solution as the liquid fuel, and high concentration fuel tank 5 for storing the high concentration fuel (50 volume-percent aqueous methanol solution) used for adjusting the concentration of the aqueous methanol solution, and water tank 9 for storing water produced by the cell reaction of the generator 11 are installed. To the anode side of cell stack 1 was supplied the aqueous methanol solution as the liquid fuel from fuel tank 2 through liquid pump 21, to the cathode side was supplied air as the oxidation gas from blower 3. From the anode side was exhausted carbon dioxide as the reaction product, and the aqueous methanol solution which was not contributed to the reaction to be sent back to fuel tank 2. From the cathode side was exhausted water as the reaction product, and air which was not contributed to the reaction to collect the produced water in water tank 9 through air/liquid separator 8, and the sensor temperature detected by the temperature detector is inputted to controller 7. Thereby, at least one of the followings can be controlled: the amount of the produced water to be sent back from water tank 9 to fuel tank 2 through liquid pump 91, the amount of the 50 volume-percent aqueous methanol solution supplied from high concentration fuel tank 5 to fuel tank 2 through liquid pump 51, the amount of the aqueous methanol solution supplied from fuel tank 2 to cell stack 1 through liquid pump 21.

Operation Control of Direct Methanol Fuel Cell System

The direct methanol fuel cell system was controlled by converting the temperature of the sensor to the methanol concentration on the basis of data of FIG. 6 and, for other parameters, by applying the same algorithm as that of Embodiment 1.

Evaluation Test 4

Liquid pump 51 was used to supply the 50 volume-percent aqueous methanol solution from high concentration fuel tank 5 to fuel tank 2 through liquid pump 51. The aqueous methanol solution was supplied at a flow rate of 500 ml/min and air was supplied at a flow rate of 40 liter/min to operate continuously the cell stack for obtaining the constant output (100 W). The trend of the methanol concentration of the aqueous methanol solution in the fuel tank 2 was properly measured by gas chromatography, and the behavior of the voltage of generator 11 was measured. The result is presented in FIG. 8.

Result

Figure 8:
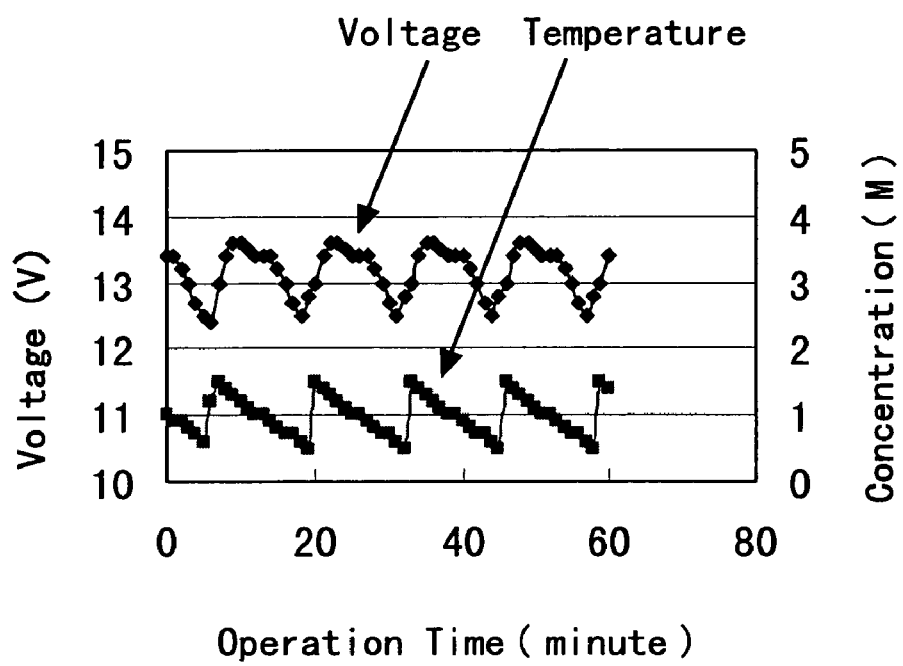
FIG. 8 is the view showing behaviors of the methanol concentration of the aqueous methanol solution and the voltage of the sensor in operation of the system according to embodiment 2 (the view showing the result of evaluation test 4.)

From FIG. 8 it can be seen that the methanol concentration of the aqueous methanol solution is actually controlled to maintain a range from 0.5 M to 1.5 M, for which the target for the management was 1 M. In other words, it was confirmed that at the point where the methanol concentration of the aqueous methanol solution reaches 1 M or lower, liquid pump 51 is used to flow the 50 volume-percent aqueous methanol solution resulting in the rise of the methanol concentration of the aqueous methanol solution to about 1.5 M and the control is operated to maintain the management target. From this result, the temperature of the sensor was detected and, on the basis of the relation between the detected temperature and the methanol concentration of the aqueous methanol solution, which corresponds to the temperature, it can be concluded that controlling the concentration is an effective method.

The system as described above uses liquid pump 51 replacing to solenoid valve 6 shown in FIG. 3. Instead of liquid pump 51, solenoid valve 6 can be used. The control by the controller 7 can be properly modified in accordance with management targets such as the concentration of and the supply of methanol in the aqueous methanol solution supplied from fuel tank 2 to cell stack 1, the concentration of the high concentration fuel stored in high concentration fuel tank 5, and the methanol concentration of the aqueous methanol solution.

In addition to liquid pump 51, when liquid pump 91 for sending back the produced water from the water tank 9 to the fuel tank 2 is controlled by the controller 7, the concentration can be controlled in a higher accuracy.

On the other hand, when liquid pump 21 used for supplying the aqueous methanol solution from fuel tank 2 to cell stack 1 is controlled by the controller 7, the system as described above can be stably operated.

Embodiment 3

Direct Methanol Fuel Cell System

Figure 9:
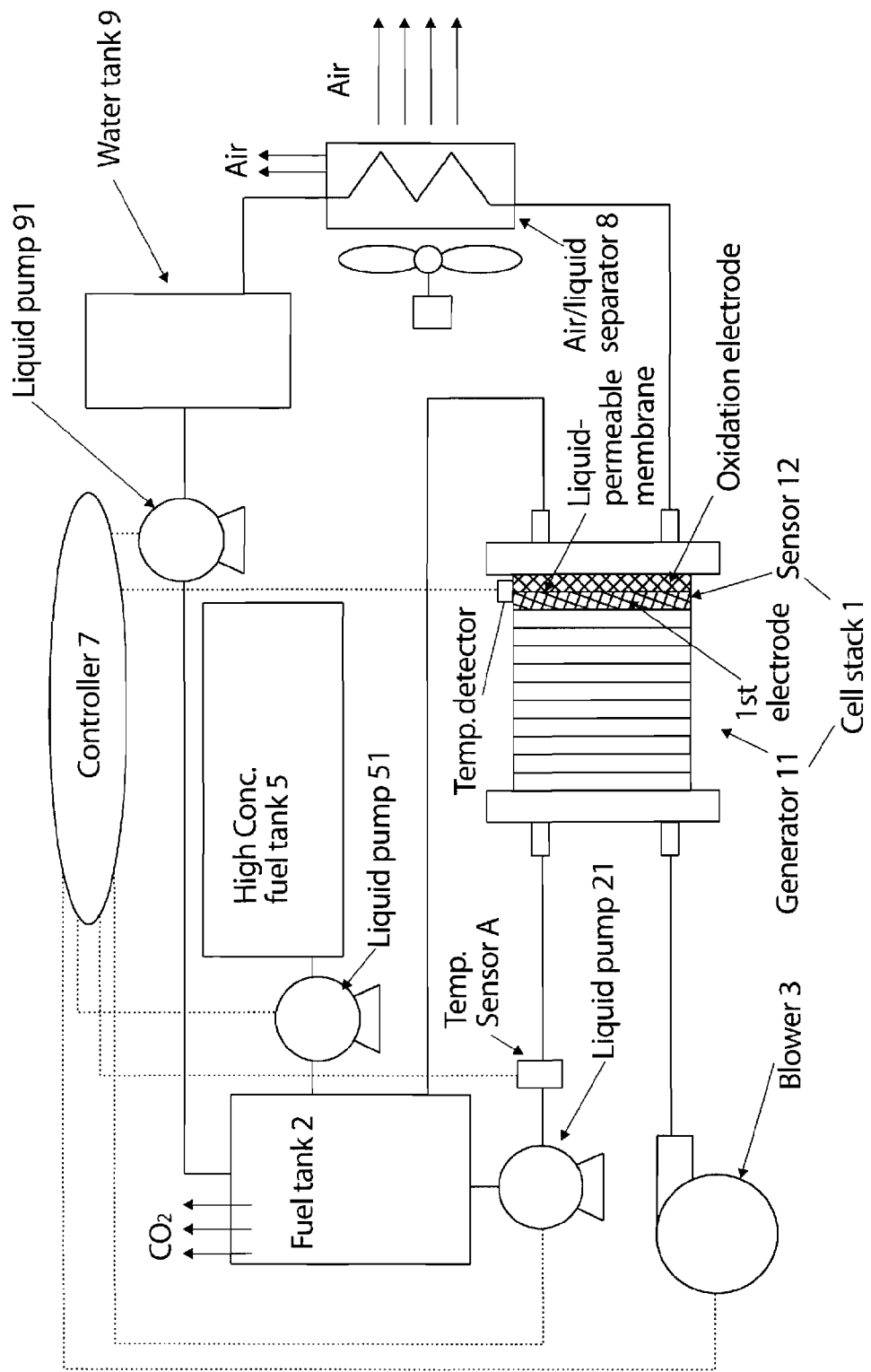
FIG. 9 is the block diagram of the direct methanol fuel cell system of embodiment 3 according to the present invention.

The system shown in FIG. 9 was configured by having, in addition to the temperature detector of the sensor 12, the second temperature sensor A in the passage from liquid pump 21 to cell stack 1 to input the temperature detected by the temperature detector of the sensor 12 and the temperature detected by the second temperature sensor A (temperature of the aqueous methanol solution supplied to cell stack 1) to controller 7 and controlling controller 7 by the temperature difference. Second temperature sensor A may be installed in an upstream immediately of the sensor 12.

Operation Control of Direct Methanol Fuel Cell System

Figure 10:
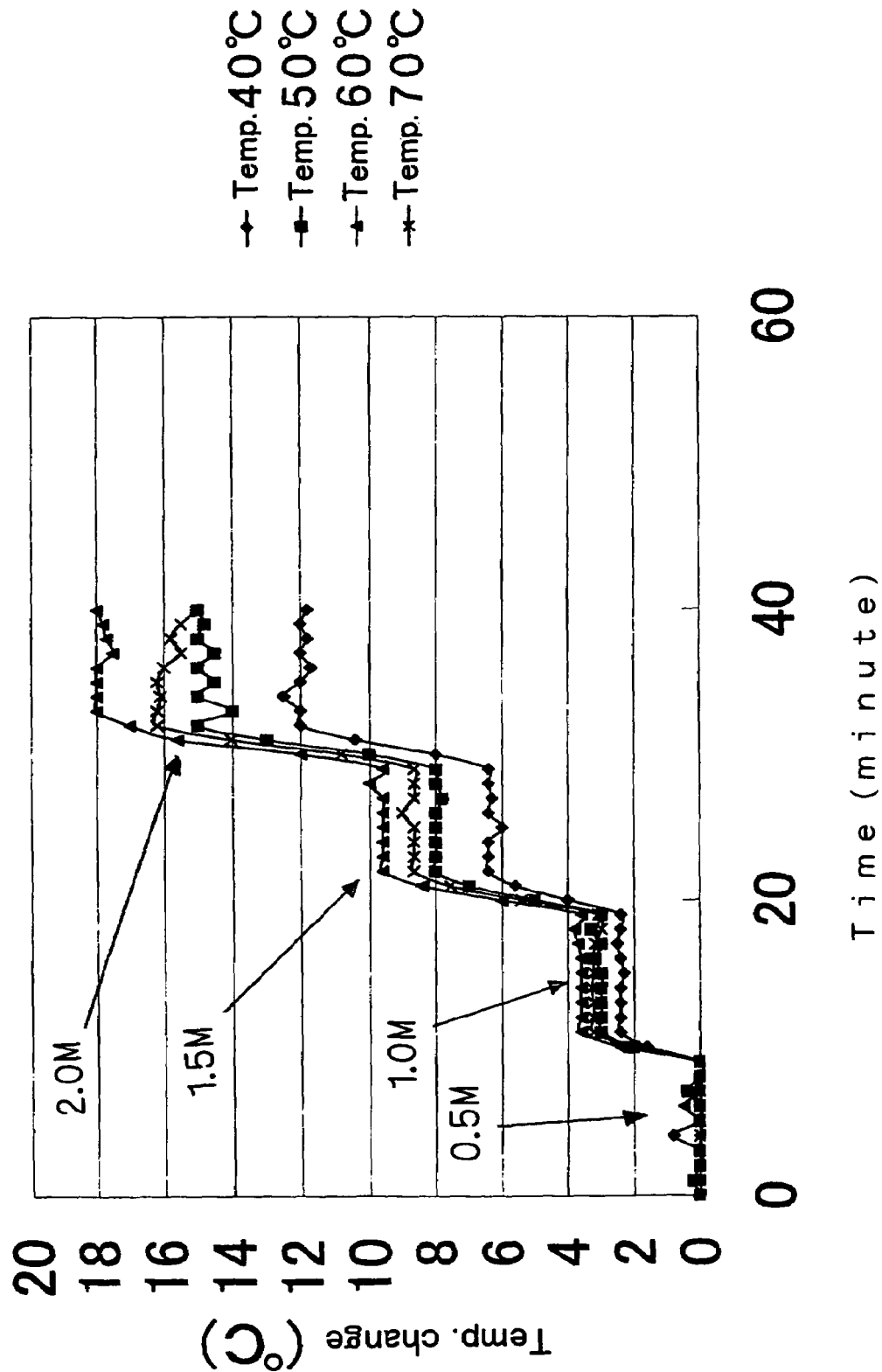
FIG. 10 is the view of a relation between a temperature difference between the temperature, which is detected by a temperature detector installed in the sensor 12, and the temperature, which is detected by a second temperature sensor A, and the methanol concentration of the aqueous methanol solution (the view showing the result of evaluation test 5.)

The direct methanol fuel cell system was controlled by converting the temperature difference as described above to the methanol concentration on the basis of data of FIG. 10 and, for other parameters, by applying the same algorithm as that of Embodiment 1.

Evaluation Test 5

Following supply of the aqueous methanol solution of each concentration as described above to the direct methanol fuel cell system at the temperature of 40 deg C., 50 deg C., 60 deg C., and 70 deg C. in the same way as evaluation test 3, the relation was measured between the temperature difference between the temperature yielded by the temperature detector of the sensor 12 and the temperature yielded by second temperature sensor A and the methanol concentration of the aqueous methanol solution. The result is presented in FIG. 10.

Result

From FIG. 10, it can be seen that the methanol concentration of the aqueous methanol solution becoming high causes a large difference in the temperature as described above. By this fact, it can be known that detecting the difference in the temperature as described above enables one to control appropriately the methanol concentration of the aqueous methanol solution.

Modification of Embodiment 3

Figure 11:
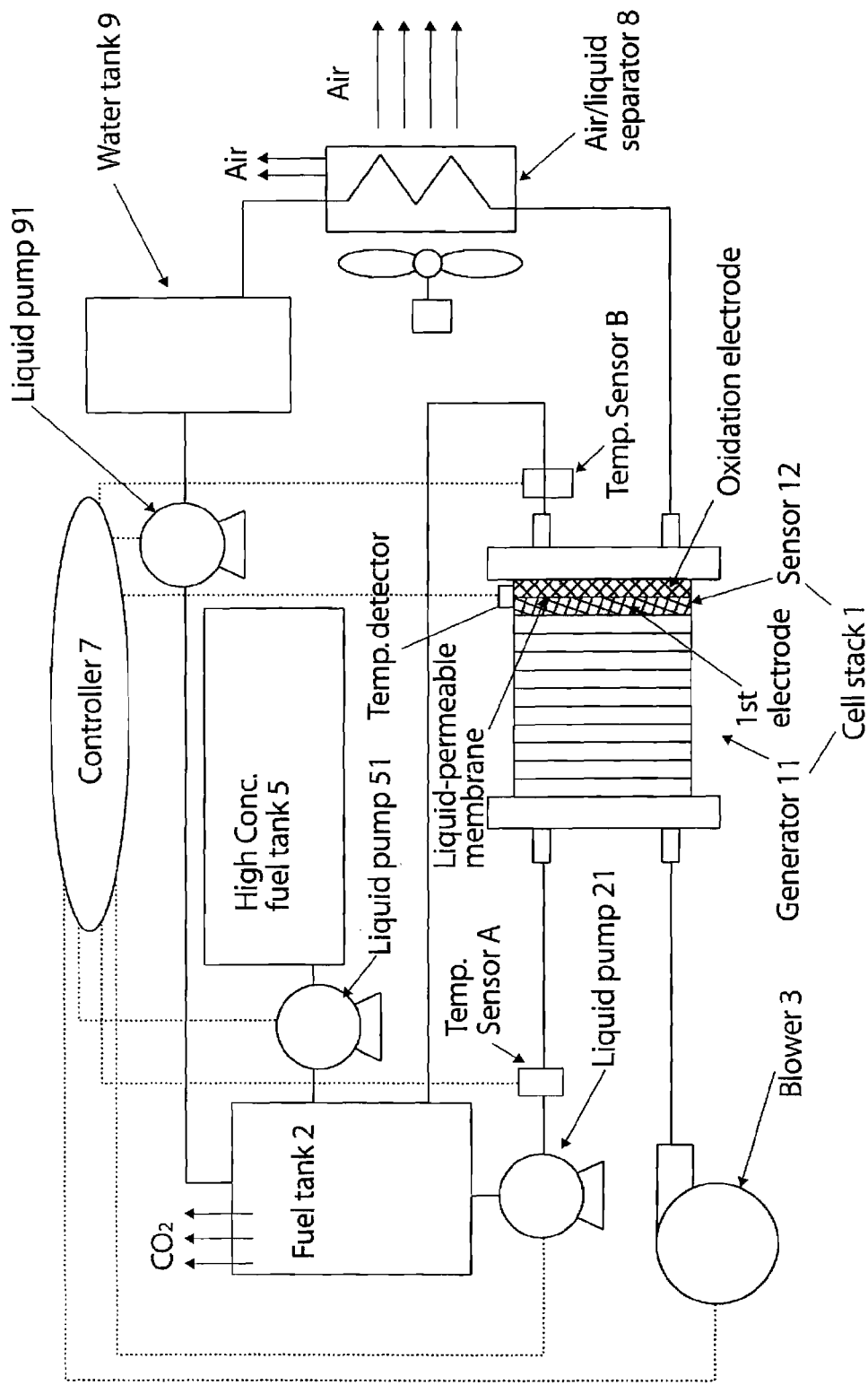
FIG. 11 is a block diagram of the direct methanol fuel cell system according to a modification of embodiment 3.

Example prepared by modifying embodiment 3 as described above can also control the methanol concentration of the aqueous methanol solution through that, as shown in FIG. 11, the system is constituted by installing third temperature sensor B in the passage from cell stack 1 to air/liquid separator 8, the temperature detected by the temperature detector of sensor 12, the temperature detected by the second temperature sensor A, the temperature detected by the temperature detector of the sensor 12, and the temperature detected by the third temperature sensor B are inputted in controller 7, and controller 7 is controlled through the temperature difference a between each temperature of the former pair of temperatures and the temperature difference b between each temperature of the latter pair of temperatures.

The liquid fuel-permeable membrane usable in embodiment 2 as described above includes a perfluoro sulfonic acid-based membrane having a large amount of the crossed-over aqueous methanol solution. As the catalyst contained in at least the oxidation electrode to oxidize the liquid fuel, a platinum catalyst used for a usual air electrode can be used. Through this step, the liquid fuel, which is crossed over, is oxidized by the platinum catalyst to generate heat. An amount of heat generated by crossing-over is calculated from this amount of generated heat and the methanol concentration of the aqueous methanol solution is calculated from the amount of generated heat. On the other hand, in an actual system, when the methanol concentration of the aqueous methanol solution is calculated from the amount of generated heat, joule heat generated by the generator should also be considered. In embodiments 2 and 3 as described above, the anode (first electrode) is not always necessary. The membrane may be the membrane such as PTFE lacking the protonic conductivity.

According to each embodiment as described above, the methanol concentration of the aqueous methanol solution is each detected by detection of the voltage, detection of the temperature, and detection of the temperature difference. These parameters can be naturally used in a proper combination. For example, it is possible in the system shown in FIG. 11 that the voltage is detected by sensor 12 of cell stack 1 and the temperature difference is detected by the second temperature sensor A installed in the passage from liquid pump 21 to cell stack 1 and the third temperature sensor B in the passage from cell stack 1 to air/liquid separator 8.

The operation controller and the operation controlling method of the direct methanol fuel cell system according to embodiment 2 and later can be realized in the same way as that of embodiment 1 and also can be realized in a form in combination of detection of the voltage, detection of the temperature, and detection of the temperature difference.

Embodiments as described above are all based on the operation at a constant output. In an actual operation, a detected temperature may be influenced by a load variation, the flow rates of the oxidizing agent gas and the liquid fuel, and a status whether at the start or in stationary state. However, the operation can be more accurately controlled by previously inputting such factors as parameters in the controller to correct the data detected by the temperature detector on the basis of these parameters.

The embodiments described above are on the direct methanol fuel cell system. However, it is natural that the embodiments can be applied to the liquid fuel direct supply fuel cell system using the liquid fuel, for example, ethanol, dimethyl ether, and isopropyl alcohol, other than methanol.

Best Embodiment

FIG. 12 to FIG. 18 show the best embodiment. In these figures, members similar to those of the embodiments and the modified embodiments of FIG. 1 to FIG. 11 express the same members and descriptions of the embodiments and the modified embodiments as described above are also applied to the best embodiment unless otherwise stated.

Figure 12:
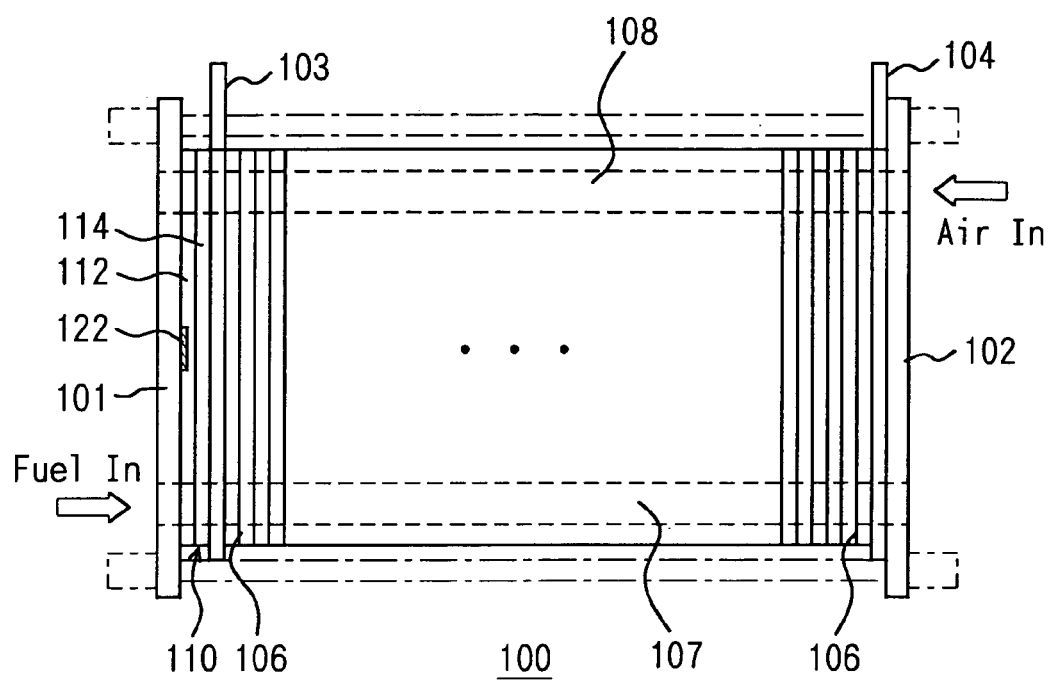
FIG. 12 shows a side view of the cell stack of a best mode of the example; showing a monitor cell mounted on an inlet side for the fuel and a supply/exhaust system for air and the fuel common to the monitor cell and other cells.

FIG. 12 shows a side view of the cell stack 100. 101 denotes an endplate in the anode side (fuel electrode,) 102 denotes the endplate in the cathode side (air electrode,) 103 denotes the terminal plate in the anode side, and 104 denotes the terminal plate in the cathode side. Between the terminal plates 103 and 104, a plurality of cells 106 are arranged and these cells have a passage groove for the fuel on the one face of a carbonaceous separator, the passage groove for air on the other face. MEA is placed between a pair of separators. Four corners of the separator have an inlet for the fuel supply and an outlet for fuel exhaust, the inlet for the air supply and the outlet for air exhaust, the inlets for the fuel supply are communicated with each other to make fuel supply passage 107, and the inlets for the air supply are communicated with each other to make air supply passage 108. Similarly, the outlets for fuel exhaust are communicated with each other to make fuel exhaust passage and the outlet for air exhaust are communicated with each other to make air exhaust passage. The supply inlet and the exhaust outlet in communication are hereafter called a manifold. The manifold 107 for fuel supply and the manifold for fuel exhaust are located in a diagonal position the separator and the manifold 108 for air supply and the manifold for air exhaust are also located in the diagonal position.

Supplying directions of the fuel and air are oppositely made and air is supplied from a top side of the one of cell stack 100 and the fuel is supplied from a bottom side of the other of cell stack 100. In such a way, carbon dioxide produced on the anode by electricity generation can be exhausted together with the fuel, which should be exhausted, from the exhaust manifold made on the top side and also water accumulation can be prevented in the manifold for air exhaust.

Monitor cell 110 as the sensor is located between the endplate 101 and the terminal plates 103 in the anode side and has the carbonaceous separator 112 in the fuel electrode and the carbonaceous separator 114 in the air electrode. It is preferable to make a thickness and size of separators 112 and 114 comparable with those of the separator of cell 106. The fuel supply inlet 116 is communicated with the manifold for supplying the fuel in cell 106 side and also the fuel exhaust outlet 117 is communicated with the manifold for exhausting the fuel in cell 106 side. On the other hand, air supply inlet 118 is communicated with the manifold for supplying air in cell 106 side and also the air exhaust outlet 119 is communicated with the manifold for air outlet in cell 106 side. In this way, a plurality of cells 106 and monitor cells 110 can be subjected to supply/exhaust of the fuel and supply/exhaust of air by the same systems. In addition, monitor cell 110 can be incorporated in cell stack 100 and terminal plates 103 and 104 can be separated from monitor cell 110.

Figure 13:
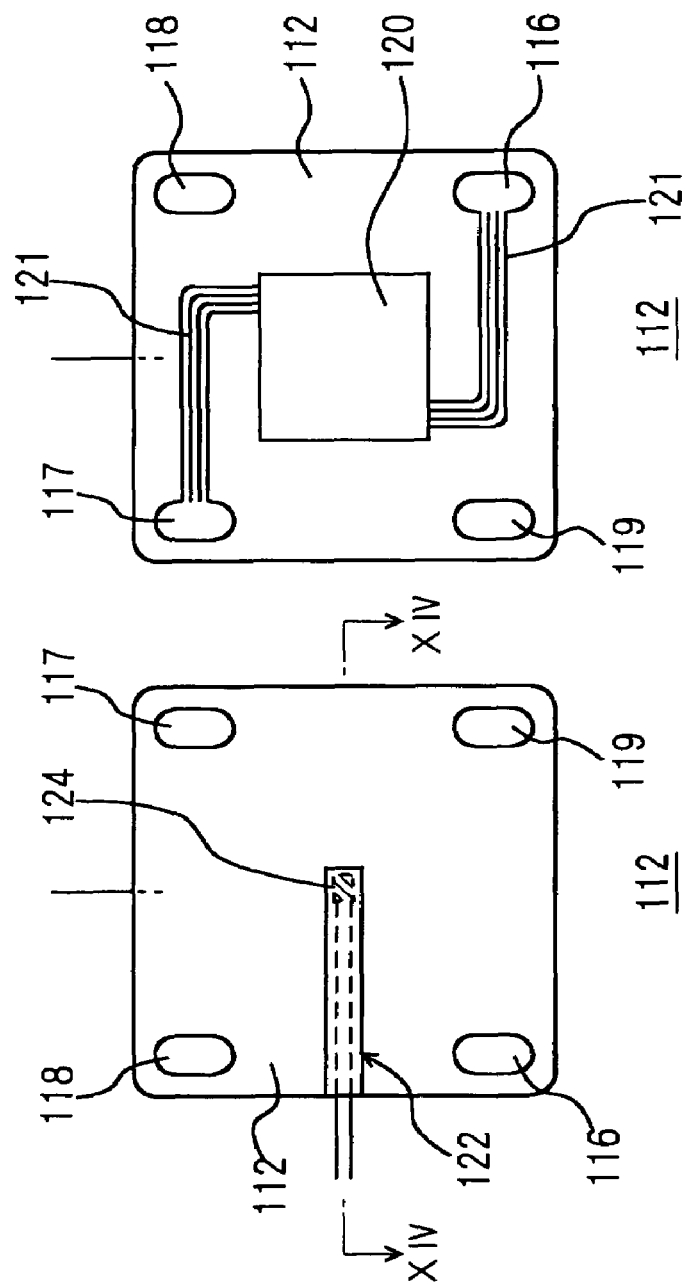
FIG. 13 is the view showing both sides of the separator in the fuel electrode side of the monitor cell in best mode of the example; and shows a thermistor mounted and MEA miniaturized (a complex made from the protonic conductive membrane and the electrode.)
Figure 14:
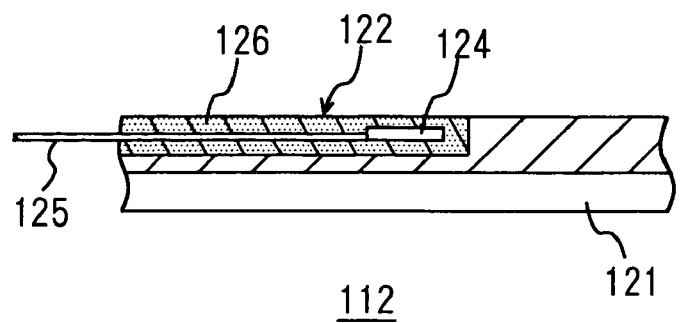
FIG. 14 shows a sectional view in a XIV-XIV direction in FIG. 13; showing the thermistor mounted on a reverse side of the separator of the fuel electrode side and a fuel passage groove.
Figure 15:
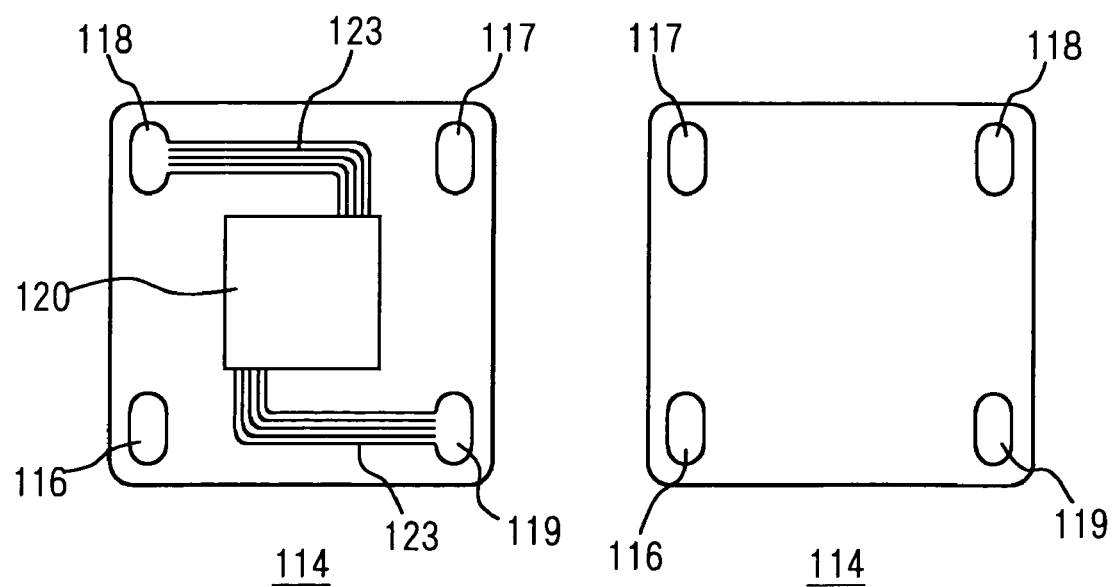
FIG. 15 is the view showing both sides of the separator in the air electrode side of the monitor cell in best mode of the example.

120 denotes MEA installed in monitor cell 110 and is, as well known, prepared by mounting the anode and the cathode on both sides of the protonic conductive polymer electrolyte membrane and, if required, a porous carbon sheet is mounted on an outside of the anode and the cathode. The size of MEA 120 may be the same size as that of MEA of the cell 106. However, preferably, as shown in FIG. 13 and FIG. 15, a smaller MEA is prepared for separators 112 and 114 the arrangement of fuel supply groove 121 and air supply groove 123 are also changed to match MEA 120 by handling the separator of cell 106. On the other hand, in MEA 120 of FIG. 13, the cathode appears on a surface and in MEA 120 of FIG. 15, the anode appears on the surface.

122 denotes a position to which the thermistor is attached and 124 is the thermistor. Hereby, a thin-type thermistor with a thickness of 0.5 mm or thinner, for example, is used as the thermistor to attach to the groove (depth 1 mm, for example,) that is made on the face opposite to the fuel electrode of separator 112, by using an adhesive 126. Separator 112 is given the thickness of 2 mm, for example, similar to the separator of cell 106.

Methanol contained in the fuel and formic acid produced by partial oxidation of methanol has actions of denaturing a metal oxide semiconductor being a material of the thermistor and corroding lead 125. On the other hand, separator 112 is conductive and, thus, adhesive 126 blocks thermistor 124 and lead 125 from the fuel and also insulates from separator 112, for example.

Figure 16:
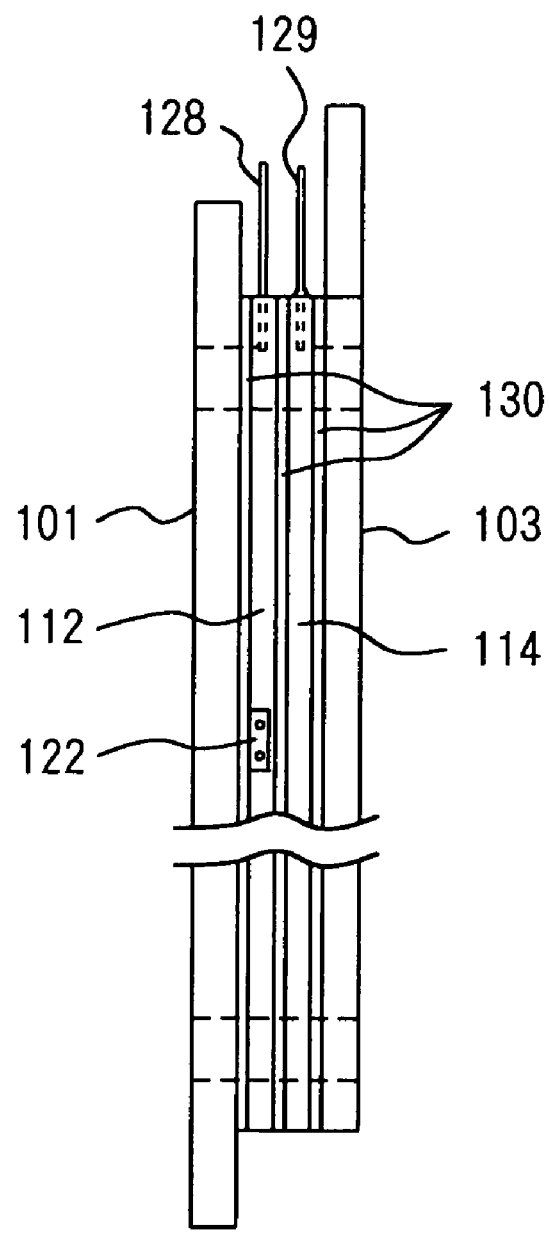
FIG. 16 is a partial side view showing the monitor cell between an end plate and a terminal plate in the cell stack of FIG. 12.

Areas (areas surrounding openings 116 to 119) around separators 112 and 114 are liquid-tight by packing 130 shown in FIG. 16. In the outside of packing 130, no fuel substantially exists and, therefore, in the outside of packing 130, no protection may be necessary for lead 125. Moreover, packing 130 insulates electrically monitor cell 110 from terminal plate 103 and end plate 101. 128 and 129 are output terminals used for getting the electromotive force of MEA 120 of monitor cell 110 and attached to separators 112 and 114, for example, by using the conductive adhesive.

If prevention of an abnormal work of thermistor 124 is necessary, a plurality of thermistors are, for example, arranged on the reverse side of separator 112 in the fuel electrode side to use the one for detection and the other as a spare or for checking the detection thermistor. On the other hand, if the problem arises in denaturation of MEA 120, it is sufficient to mount a plurality of monitor cells 110 and the thermistors 124 corresponding to each thermistor.

In this way, monitor cell 110 can be easily incorporated in cell stack 100 to make easy supply and exhaust of the fuel and air possible and, also, make separation of the work for taking-out the output from monitor cell 110 and terminal plates 103 and 104 possible. In addition, monitor cell 110 is located in the fuel inlet side resulting in no influence of a temperature rise of cell stack 100 to allow measuring a fuel temperature. Furthermore, miniaturized MEA 120 allows constituting monitor cell 110 for a low price and thermistor 124 made in a thin form allows making the thickness of separators 112 and 114 small. And, protecting thermistor 124 and lead 125 thereof by using adhesive 126 can prevent denaturation of the thermistor and corrosion of the lead, which are caused by the fuel.

On the other hand, instead of thermistor 124, a resistance thermometer sensor and a temperature sensitive semiconductor may be employed. It is possible that instead of adhesive 126, an insulation sheet, of which both sides may be applied with the adhesive or the tackiness agent, is adhered to a groove made on the reverse side (face opposite to the anode) of separator 112, thermistor 124 is mounted thereon, and an exposed surface of thermistor 124 may be protected by other sheet, to which the adhesive is applied.

As shown in FIG. 5, a decreased fuel concentration causes the increase in the electromotive force of the monitor cell and an increased fuel concentration causes the decrease in the electromotive force. If it is assumed that the fuel concentration in the cathode side is substantially 0, such the phenomenon cannot be understood. Therefore, it can be considered that methanol crossing over the protonic conductive polymer electrolyte membrane may be involved. Factors involved in the electromotive force are the concentration and temperature of the fuel in each of the anode and the cathode sides and the oxygen concentrations in each of the anode and the cathode. Of these factors, the oxygen concentrations are temporarily regarded as almost constant and the temperature can be compensated by the thermistor. Increase in the fuel concentration in the anode side causes a great increase in crossing-over and, in accordance with this, the increase in the fuel concentration in the cathode side takes place in a larger proportion than that in which the fuel concentration in the anode side increase. Therefore, the increase in the fuel concentration makes the ratio of the fuel concentration between the anode side and the cathode side small to cause a reduction of the electromotive force. The inventors presume as described above that the reduction of the electromotive force is caused by the increase in the fuel concentration.

As shown in FIG. 5, from the time of the electromotive force of the sensor exceeding predetermined value, the solenoid valve being opened, and the high concentration fuel being added to the fuel tank to the time of the electromotive force reducing, there is a lag time of about 20 seconds, for example. Thus, for adding the high concentration fuel to the fuel tank, it is preferable that when the electromotive force, of which temperature has been compensated, exceeds the predetermined value, the high concentration fuel is added for a predetermined time followed by no addition of the high concentration fuel for the predetermined time regardless of the electromotive force.

Figure 17:
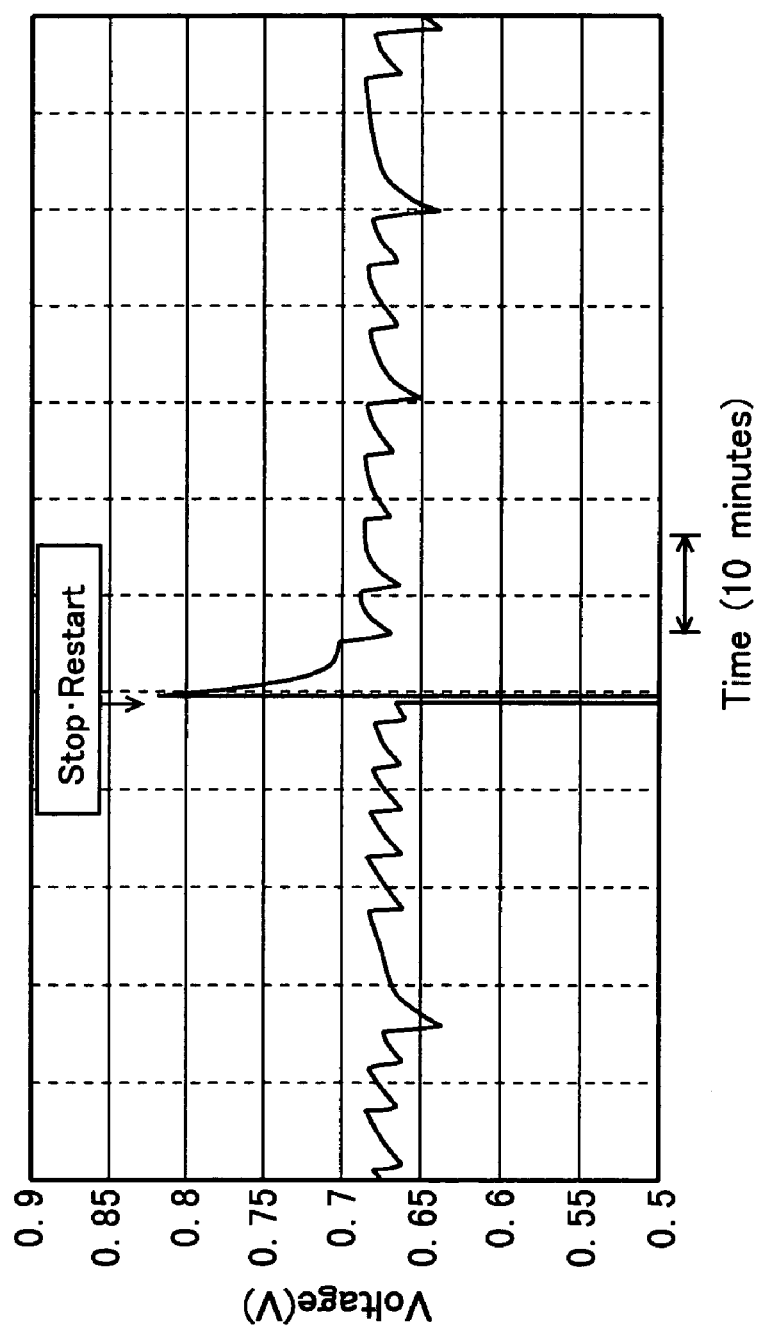
FIG. 17 is the view showing a working waveform of the best mode of the example.

FIG. 17 shows the output of the monitor cell, when the operation of cell stack 100 is restarted after once stopped. This output is the output, of which temperature has been compensated, and, hence, during the stop of the operation, both the circulation of the fuel and the supply of air are stopped.

When the operation is stopped for a short time and then restarted, the electromotive force shows an anomalous value for some minutes followed by a stationary value. Then, for this time, it is preferable to stop controlling the fuel concentration by applying the electromotive force. However, a case occurs quickly to start controlling the fuel concentration. Not shown in FIG. 17, it is preferable that restarting after stopping the operation of cell stack 100 for a long period causes a low fuel temperature and a low cell stack temperature and, therefore, for raising these temperatures and stabilizing the output, the operation is carried out by applying a higher concentration than that in a normal operation.

Figure 18:
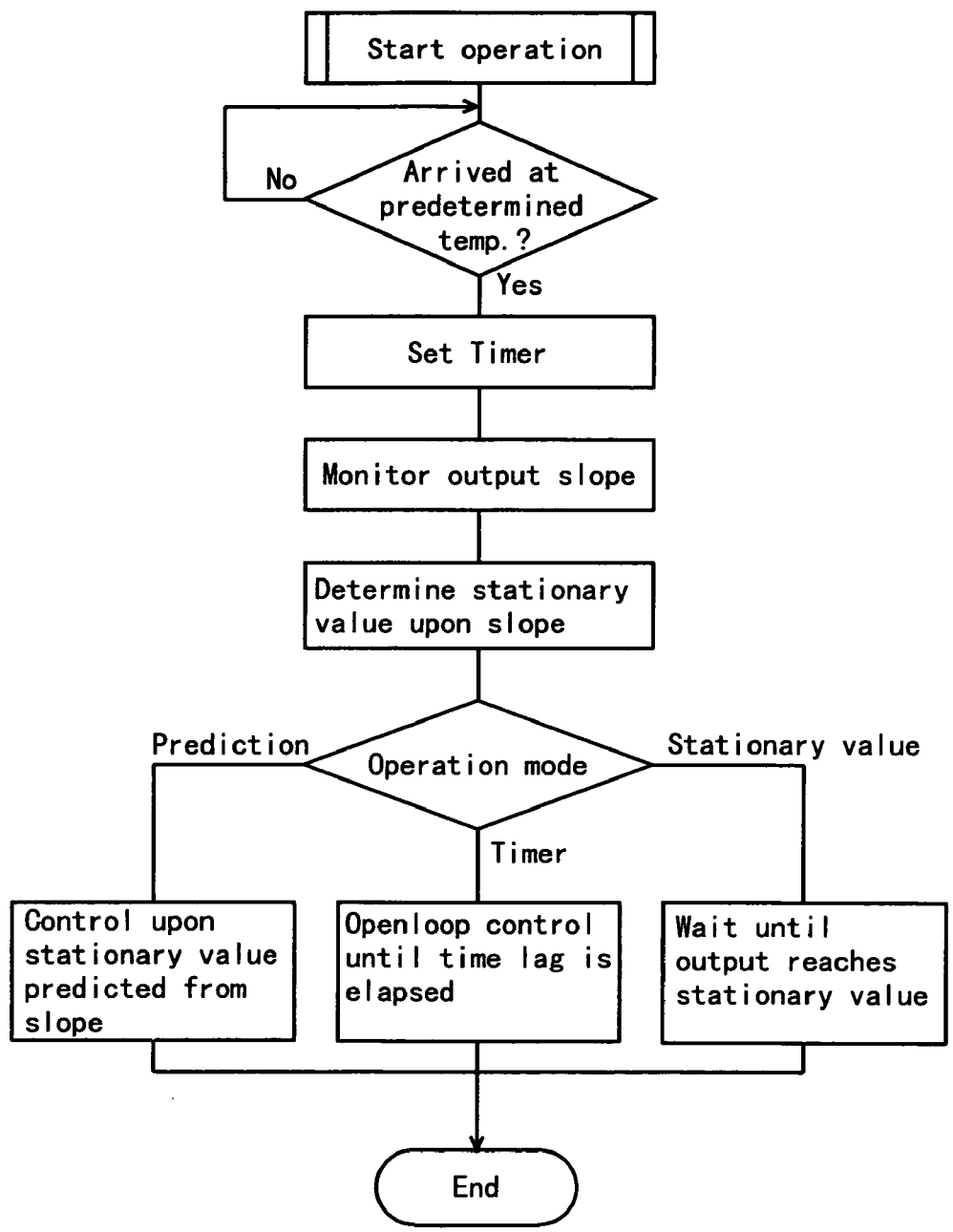
FIG. 18 is a flow chart showing an algorithm for controlling the fuel concentration at a start of the fuel cell system.

FIG. 18 shows the control algorithm for operating a processing for the start at a low temperature and the processing for the anomalous value of the electromotive force at the restart of the operation. When the operation of the cell stack is started, whether or not the cell temperature reaches the predetermined or higher temperature is determined and, until it reaches the predetermined temperature, the fuel having the concentration higher than that in the normal operation is supplied to cell stack 100 by the open loop control without using the electromotive force. When it reaches the predetermined temperature, a timer applied to the time lag for 5 min to 20 min, for example, is started to monitor the slope of the electromotive force (a gradient of electromotive force,) of which temperature has been compensated.

The stabilized value of the electromotive force, of which temperature is compensated, is predicted from the slope and, subsequently, whether or not an operation mode is a predicting operation mode or a timer mode or the stationary value mode is determined. In the case of a predicting operation, the stabilized value of the temperature compensated electromotive force calculated from the slope is used for the control of the fuel concentration in comparison with the predetermined value. In the timer mode, the open loop control is continued until the lag time is consumed after the work of the timer is completed. In the stationary value mode, according to whether the gradient of the slope is the predetermined or lower value, whether the temperature compensated electromotive force reaches the stationary value is determined. When it reaches the stationary value, the feedback control is started.

The invention claimed is:

1. A liquid fuel direct supply fuel cell system, comprising:
a generator having a plurality of cells connected serially or in parallel, wherein at least one of the cells has an anode and a cathode which are oppositely installed through a protonic conductive polymer electrolyte membrane, a liquid fuel is supplied from a fuel inlet to the anode and is exhausted from a fuel outlet, and an oxidizing agent gas is supplied from a gas inlet to the cathode and is exhausted from a gas outlet;
a fuel tank for storing the liquid fuel to be supplied to the anode;
a high concentration fuel tank for storing a high concentration fuel used for regulating a concentration of the liquid fuel in the fuel tank; and
a water tank for storing water produced by a cell reaction of the generator,
a sensor integrally installed with the generator and comprising a temperature detector and a monitor cell having a protonic conductive polymer electrolyte membrane, an anode and a cathode installed on both faces of the membrane, a fuel inlet for supplying the liquid fuel to the anode, a fuel outlet for exhausting the liquid fuel from the anode, a gas inlet for supplying an oxidizing agent gas to the cathode, and a gas outlet for exhausting the oxidizing agent gas from the cathode; the sensor detecting the concentration of the liquid fuel by a temperature compensated electromotive force, produced by compensating an electromotive force of the monitor cell by an output signal of the temperature detector,
the fuel inlet and the fuel outlet of the sensor being communicated with the fuel inlet and the fuel outlet of the generator, respectively, and the oxidizing agent gas inlet and the oxidizing agent gas outlet of the sensor being communicated with the oxidizing agent gas inlet and the oxidizing agent gas outlet of the generator, respectively, and
a controller for operating at least one of a control of a supply of the high concentration fuel from the high concentration fuel tank to the fuel tank, a control of a supply of water from the water tank to the fuel tank, and a control of a supply of the liquid fuel from the fuel tank to the generator, on the basis of the output signal from the sensor.

2. A liquid fuel direct supply fuel cell system according to claim 1, wherein:
a second temperature detector is installed in at least one place around the fuel inlet of the generator or around the fuel outlet of the generator, for detecting a temperature around the place, to measure heat generated by the liquid fuel, permeated through the electrolyte membrane of the monitor cell and oxidized by the cathode, on the basis of a difference between the signal from the temperature detector of the sensor and the signal from the second temperature detector.

3. A liquid fuel direct supply fuel cell system according to claim 1, wherein:
the oxidizing agent is air,
the sensor has at least one pair of separators, in which a via hole for air inlet and a via hole for air outlet and a via hole for fuel inlet and a via hole for fuel outlet are made, and has the protonic conductive polymer electrolyte membrane and the anode and the cathode of the sensor are disposed between the separators,
each cell of the generator has separators, in which a via hole for air inlet and a via hole for air outlet and a via hole for fuel inlet and a via hole for fuel outlet are made, and
the sensor is arranged in a side for the fuel inlet to the generator.

4. A liquid fuel direct supply fuel cell system according to claim 1, wherein:
the generator has an anode side endplate and an anode side terminal plate at one end of the plurality of cells and a cathode side endplate and a cathode side terminal plate at the other end; and
the sensor is installed between the endplate and the terminal plate of the anode side.

5. A liquid fuel direct supply fuel cell system according to claim 3, wherein:
the temperature detector is mounted on a reverse side of the protonic conductive electrolyte membrane of the separator of in the anode side of the sensor.

6. A liquid fuel direct supply fuel cell system according to claim 1, wherein:
a fuel concentration decline is detected from an increase in the temperature compensated electromotive force, between the anode and the cathode, and a fuel concentration rise is detected from a decrease in the temperature compensated electromotive force.

7. A liquid fuel direct supply fuel cell system according to claim 6, further including:
a means for determining a slope of a change in the temperature compensated electromotive force at a start of operation.

8. A liquid fuel direct supply fuel cell system according to claim 7, further including:
a means for getting the temperature of the generator and for subjecting the fuel concentration to an open loop control, separately from the temperature compensated electromotive force, until the generator reaches a predetermined temperature, at the start of operation.

9. A method for the liquid fuel direct supply fuel cell system, comprising:
a generator having a plurality of cells connected serially or in parallel, wherein at least one of the cells has an anode and a cathode which are oppositely installed through a protonic conductive polymer electrolyte membrane, a liquid fuel is supplied from a fuel inlet to the anode and is exhausted from a fuel outlet, and an oxidizing agent gas is supplied from a gas inlet to the cathode and is exhausted from a gas outlet;

a fuel tank for storing the liquid fuel to be supplied to the anode;

a high concentration fuel tank for storing a high concentration fuel used for regulating a concentration of the liquid fuel in the fuel tank;

a water tank for storing water produced by a cell reaction of the generator, providing a sensor integrally installed with the generator and comprising a temperature detector and a monitor cell having a protonic conductive polymer electrolyte membrane, an anode and a cathode installed on both faces of the membrane, a fuel inlet for supplying the liquid fuel to the anode, a fuel outlet for exhausting the liquid fuel from the anode, a gas inlet for supplying an oxidizing agent gas to the cathode, and a gas outlet for exhausting the oxidizing agent gas from the cathode; the sensor detecting the concentration of the liquid fuel by a temperature compensated electromotive force, produced by compensating an electromotive force of the monitor cell by an output signal of the temperature detector, making the fuel inlet and the fuel outlet of the sensor communicated with the fuel inlet and the fuel outlet of the generator respectively and making the oxidizing agent gas inlet and the oxidizing agent gas outlet of the sensor communicated with the oxidizing agent gas inlet and the oxidizing agent gas outlet of the generator respectively, and providing a controller for operating at least one of a control of a supply of the high concentration fuel from the high concentration fuel tank to the fuel tank, a control of a supply of water from the water tank to the fuel tank, and a control of a supply of the liquid fuel from the fuel tank to the generator, on the basis of the output signal from the sensor.

10. An operation control device of the liquid fuel direct supply fuel cell system, comprising:

a generator having a plurality of cells connected serially or in parallel, wherein at least one of the cells has an anode and a cathode which are oppositely installed through a protonic conductive polymer electrolyte membrane, a liquid fuel is supplied from a fuel inlet to the anode and is exhausted from a fuel outlet, and an oxidizing agent gas is supplied from a gas inlet to the cathode and is exhausted from a gas outlet;

a fuel tank for storing the liquid fuel to be supplied to the anode;

a high concentration fuel tank for storing a high concentration fuel used for regulating a concentration of the liquid fuel in the fuel tank;

a water tank for storing water produced by a cell reaction of the generator, a sensor integrally installed with the generator and comprising a temperature detector and a monitor cell having a protonic conductive polymer electrolyte membrane, an anode and a cathode installed on both faces of the membrane, a fuel inlet for supplying the liquid fuel to the anode, a fuel outlet for exhausting the liquid fuel from the anode, a gas inlet for supplying an oxidizing agent gas to the cathode, and a gas outlet for exhausting the oxidizing agent gas from the cathode; the sensor detecting the concentration of the liquid fuel by a temperature compensated electromotive force, produced by compensating an electromotive force of the monitor cell by an output signal of the temperature detector, the fuel inlet and the fuel outlet of the sensor being communicated with the fuel inlet and the fuel outlet of the generator, respectively and the oxidizing agent gas inlet and the oxidizing agent gas outlet of the sensor being communicated with the oxidizing agent gas inlet and the oxidizing agent gas outlet of the generator, respectively, and a controller for operating at least one of a control of a supply of the high concentration fuel from the high concentration fuel tank to the fuel tank, a control of a supply of water from the water tank to the fuel tank, and a control of a supply of the liquid fuel from the fuel tank to the generator, on the basis of the output signal from the sensor.

* * * * *

UNITED STATES PATENT AND TRADEMARK OFFICE
CERTIFICATE OF CORRECTION

PATENT NO.      : 7,618,729 B2                                  Page 1 of 1
APPLICATION NO. : 10/529445
DATED           : November 17, 2009
INVENTOR(S)     : Ryoichi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Twenty-sixth Day of October, 2010

David J. Kappos
*Director of the United States Patent and Trademark Office*